US008453329B2

(12) United States Patent
North et al.

(10) Patent No.: US 8,453,329 B2
(45) Date of Patent: Jun. 4, 2013

(54) METHOD OF FABRICATING INKJET PRINTHEAD HAVING LOW-LOSS CONTACT FOR THERMAL ACTUATORS

(75) Inventors: Angus John North, Balmain (AU); Richard Dimagiba, Balmain (AU); Witold Roman Wiszniewski, Balmain (AU)

(73) Assignee: Zamtec Ltd, Dublin (IE)

( * ) Notice: Subject to any disclaimer, the term of this patent is extended or adjusted under 35 U.S.C. 154(b) by 356 days.

(21) Appl. No.: 12/909,754

(22) Filed: Oct. 21, 2010

(65) Prior Publication Data

US 2011/0094103 A1 Apr. 28, 2011

Related U.S. Application Data

(60) Provisional application No. 61/254,138, filed on Oct. 22, 2009.

(51) Int. Cl.
*B21D 53/76* (2006.01)
*B23P 17/00* (2006.01)

(52) U.S. Cl.
USPC ............................................ 29/890.1; 29/852

(58) Field of Classification Search
USPC ..... 29/890.1, 611, 852, 874; 347/20; 174/250
See application file for complete search history.

(56) References Cited

U.S. PATENT DOCUMENTS

| | | | | |
|---|---|---|---|---|
| 4,856,184 A * | 8/1989 | Doeling | .......................... | 29/852 |
| 4,943,346 A * | 7/1990 | Mattelin | .......................... | 216/17 |
| 5,189,261 A * | 2/1993 | Alexander et al. | ............ | 174/263 |
| 5,227,013 A * | 7/1993 | Kumar | ............................ | 216/18 |
| 5,567,329 A * | 10/1996 | Rose et al. | ....................... | 216/18 |
| 5,746,868 A * | 5/1998 | Abe | .............................. | 156/247 |
| 5,800,650 A * | 9/1998 | Anderson et al. | ............. | 156/150 |
| 5,863,446 A * | 1/1999 | Hanson | ........................... | 216/16 |
| 5,910,255 A * | 6/1999 | Noddin | ........................... | 216/18 |
| 6,054,761 A * | 4/2000 | McCormack et al. | ........ | 257/698 |
| 6,662,443 B2 * | 12/2003 | Chou et al. | ....................... | 29/852 |
| 7,083,901 B2 * | 8/2006 | Egitto et al. | .................. | 430/320 |
| 7,705,456 B2 * | 4/2010 | Hu | ................................ | 257/737 |
| 7,774,930 B2 * | 8/2010 | Tai et al. | .......................... | 29/830 |
| 2002/0000037 A1 * | 1/2002 | Chou et al. | ....................... | 29/852 |
| 2005/0005439 A1 * | 1/2005 | Carpenter et al. | .............. | 29/852 |
| 2005/0039948 A1 * | 2/2005 | Asai et al. | ..................... | 174/262 |

* cited by examiner

*Primary Examiner* — David Angwin
(74) *Attorney, Agent, or Firm* — Cooley LLP

(57) ABSTRACT

A method of fabricating an inkjet printhead is provided in which a supporting substrate is provided, a conductive layer is deposited and patterned on one side of the supporting substrate, an insulating layer is deposited on the conductive layer, holes are etched through the insulating layer to the conductive layer, metal is deposited in the holes to form metallic vias, an outer surface of the insulating layer and one end of each of the metallic vias are planarized, and a layer of heater material is deposited and patterned on the outer surface to form a heater with a resistive element extending between a pair of contacts. The metallic vias electrically connect the contacts to the conductive layer.

5 Claims, 29 Drawing Sheets

METHOD OF FABRICATING INKJET PRINTHEAD HAVING LOW-LOSS CONTACT FOR THERMAL ACTUATORS

FIELD OF THE INVENTION

The present invention relates to the field of thermal inkjet printers. In particular, the invention reduces the resistive losses in the electrical connection between the thermal actuators and underlying drive circuitry in an inkjet printhead.

CO-PENDING APPLICATIONS

The following applications have been filed by the Applicant simultaneously with the present application:

Ser. No. 12/909,748

The disclosures of these co-pending applications are incorporated herein by reference. The above applications have been identified by their filing docket number, which will be substituted with the corresponding application number, once assigned.

CROSS REFERENCES TO RELATED APPLICATIONS

Various methods, systems and apparatus relating to the present invention are disclosed in the following US Patents/Patent Applications filed by the applicant or assignee of the present invention:

| | | | | |
|---|---|---|---|---|
| 6,750,901 | 6,476,863 | 6,788,336 | 7,249,108 | 6,566,858 |
| 6,331,946 | 6,246,970 | 6,442,525 | 09/517,384 | 09/505,951 |
| 6,374,354 | 7,246,098 | 6,816,968 | 6,757,832 | 6,334,190 |
| 6,745,331 | 7,249,109 | 7,197,642 | 7,093,139 | 10/636,263 |
| 10/636,283 | 10/866,608 | 7,210,038 | 10/902,883 | 10/940,653 |
| 10/942,858 | 11/003,786 | 7,258,417 | 7,293,853 | 11/003,334 |
| 7,270,395 | 11/003,404 | 11/003,419 | 11/003,700 | 7,255,419 |
| 7,284,819 | 7,229,148 | 7,258,416 | 7,273,263 | 7,270,393 |
| 6,984,017 | 11/003,699 | 11/071,473 | 11/003,463 | 11/003,701 |
| 11/003,683 | 11/003,614 | 7,284,820 | 11/003,684 | 7,246,875 |
| 7,322,669 | 6,623,101 | 6,406,129 | 6,505,916 | 6,457,809 |
| 6,550,895 | 6,457,812 | 7,152,962 | 6,428,133 | 7,204,941 |
| 7,282,164 | 10/815,628 | 7,278,727 | 10/913,373 | 10/913,374 |
| 10/913,372 | 7,138,391 | 7,153,956 | 10/913,380 | 10/913,379 |
| 10/913,376 | 7,122,076 | 7,148,345 | 11/172,816 | 11/172,815 |
| 11/172,814 | 10/407,212 | 7,252,366 | 10/683,064 | 10/683,041 |
| 6,746,105 | 7,156,508 | 7,159,972 | 7,083,271 | 7,165,834 |
| 7,080,894 | 7,201,469 | 7,090,336 | 7,156,489 | 10/760,233 |
| 10/760,246 | 7,083,257 | 7,258,422 | 7,255,423 | 7,219,980 |
| 10/760,253 | 10/760,255 | 10/760,209 | 7,118,192 | 10/760,194 |
| 7,322,672 | 7,077,505 | 7,198,354 | 7,077,504 | 10/760,189 |
| 7,198,355 | 10/760,232 | 7,322,676 | 7,152,959 | 7,213,906 |
| 7,178,901 | 7,222,938 | 7,108,353 | 7,104,629 | 7,246,886 |
| 7,128,400 | 7,108,355 | 6,991,322 | 7,287,836 | 7,118,197 |
| 10/728,784 | 10/728,783 | 7,077,493 | 6,962,402 | 10/728,803 |
| 7,147,308 | 10/728,779 | 7,118,198 | 7,168,790 | 7,172,270 |
| 7,229,155 | 6,830,318 | 7,195,342 | 7,175,261 | 10/773,183 |
| 7,108,356 | 7,118,202 | 10/773,186 | 7,134,744 | 10/773,185 |
| 7,134,743 | 7,182,439 | 7,210,768 | 10/773,187 | 7,134,745 |
| 7,156,484 | 7,118,201 | 7,111,926 | 10/773,184 | 7,018,021 |
| 11/060,751 | 11/060,805 | 11/188,017 | 11/097,308 | 11/097,309 |
| 7,246,876 | 11/097,299 | 11/097,310 | 11/097,213 | 11/210,687 |
| 11/097,212 | 7,147,306 | 09/575,197 | 7,079,712 | 6,825,945 |
| 09/575,165 | 6,813,039 | 6,987,506 | 7,038,797 | 6,980,318 |
| 6,816,274 | 7,102,772 | 09/575,186 | 6,681,045 | 6,728,000 |
| 7,173,722 | 7,088,459 | 09/575,181 | 7,068,382 | 7,062,651 |
| 6,789,194 | 6,789,191 | 6,644,642 | 6,502,614 | 6,622,999 |
| 6,669,385 | 6,549,935 | 6,987,573 | 6,727,996 | 6,591,884 |
| 6,439,706 | 6,760,119 | 7,295,332 | 6,290,349 | 6,428,155 |
| 6,785,016 | 6,870,966 | 6,822,639 | 6,737,591 | 7,055,739 |
| 7,233,320 | 6,830,196 | 6,832,717 | 6,957,768 | 09/575,172 |
| 7,170,499 | 7,106,888 | 7,123,239 | 10/727,181 | 10/727,162 |
| 10/727,163 | 10/727,245 | 7,121,639 | 7,165,824 | 7,152,942 |

-continued

| | | | | |
|---|---|---|---|---|
| 10/727,157 | 7,181,572 | 7,096,137 | 7,302,592 | 7,278,034 |
| 7,188,282 | 10/727,159 | 10/727,180 | 10/727,179 | 10/727,192 |
| 10/727,274 | 10/727,164 | 10/727,161 | 10/727,198 | 10/727,158 |
| 10/754,536 | 10/754,938 | 10/727,227 | 10/727,160 | 10/934,720 |
| 7,171,323 | 10/296,522 | 6,795,215 | 7,070,098 | 7,154,638 |
| 6,805,419 | 6,859,289 | 6,977,751 | 6,398,332 | 6,394,573 |
| 6,622,923 | 6,747,760 | 6,921,144 | 10/884,881 | 7,092,112 |
| 7,192,106 | 11/039,866 | 7,173,739 | 6,986,560 | 7,008,033 |
| 11/148,237 | 7,195,328 | 7,182,422 | 10/854,521 | 10/854,522 |
| 10/854,488 | 7,281,330 | 10/854,503 | 10/854,504 | 10/854,509 |
| 7,188,928 | 7,093,989 | 10/854,497 | 10/854,495 | 10/854,498 |
| 10/854,511 | 10/854,512 | 10/854,525 | 10/854,526 | 10/854,516 |
| 7,252,353 | 10/854,515 | 7,267,417 | 10/854,505 | 10/854,493 |
| 7,275,805 | 7,314,261 | 10/854,490 | 7,281,777 | 7,290,852 |
| 10/854,528 | 10/854,523 | 10/854,527 | 10/854,524 | 10/854,520 |
| 10/854,514 | 10/854,519 | 10/854,513 | 10/854,499 | 10/854,501 |
| 7,266,661 | 7,243,193 | 10/854,518 | 10/854,517 | 10/934,628 |
| 7,163,345 | 10/760,254 | 10/760,210 | 10/760,202 | 7,201,468 |
| 10/760,198 | 10/760,249 | 7,234,802 | 7,303,255 | 7,287,846 |
| 7,156,511 | 10/760,264 | 7,258,432 | 7,097,291 | 10/760,222 |
| 10/760,248 | 7,083,273 | 10/760,192 | 10/760,203 | 10/760,204 |
| 10/760,205 | 10/760,206 | 10/760,267 | 10/760,270 | 7,198,352 |
| 10/760,271 | 7,303,251 | 7,201,470 | 7,121,655 | 7,293,861 |
| 7,232,208 | 10/760,186 | 10/760,261 | 7,083,272 | 11/014,764 |
| 11/014,763 | 11/014,748 | 11/014,747 | 11/014,761 | 11/014,760 |
| 11/014,757 | 7,303,252 | 7,249,822 | 11/014,762 | 7,311,382 |
| 11/014,723 | 11/014,756 | 11/014,736 | 11/014,759 | 11/014,758 |
| 11/014,725 | 11/014,739 | 11/014,738 | 11/014,737 | 7,322,684 |
| 7,322,685 | 7,311,381 | 7,270,405 | 7,303,268 | 11/014,735 |
| 11/014,734 | 11/014,719 | 11/014,750 | 11/014,749 | 7,249,833 |
| 11/014,769 | 11/014,729 | 11/014,743 | 11/014,733 | 7,300,140 |
| 11/014,755 | 11/014,765 | 11/014,766 | 11/014,740 | 7,284,816 |
| 7,284,845 | 7,255,430 | 11/014,744 | 11/014,741 | 11/014,768 |
| 7,322,671 | 11/014,718 | 11/014,717 | 11/014,716 | 11/014,732 |
| 11/014,742 | 11/097,268 | 11/097,185 | 11/097,184 | |

The disclosures of these applications and patents are incorporated herein by reference.

BACKGROUND OF THE INVENTION

The present invention involves the ejection of ink drops by way of forming gas or vapor bubbles in a bubble forming liquid. This principle is generally described in U.S. Pat. No. 3,747,120 (Stemme). Each pixel in the printed image is derived from ink drops ejected from one or more ink nozzles. In recent years, inkjet printing has become increasing popular primarily due to its inexpensive and versatile nature. Many different aspects and techniques for inkjet printing are described in detail in the above cross referenced documents.

The Applicant has developed a range of pagewidth printheads. Pagewidth printheads have an elongate array of nozzles extending the printing width of the media substrate. These printheads are faster than traditional scanning printheads as the paper continuous feeds past the printhead which remains stationary. In contrast, scanning printheads traverse the page to print successive swathes as the paper is indexed through the printer.

The large number of nozzles in a pagewidth printhead generates much more heat than a corresponding scanning printhead. This requires pagewidth printheads to be 'self cooling' as complex and elaborate cooling systems would not be commercially practical. Self cooling is a process whereby heat generated in the ejection process is removed from the printhead by the ejected drops of ink. Without a build up of excessive heat, the theoretical maximum firing frequency of a self cooling printhead nozzle is only restricted by the ink refill rate of the nozzle.

Low energy droplet ejection is key to the Applicants printheads self cooling operation. Reducing the energy input to each nozzle, reduces the energy that the ejected drops need to remove in order to achieve self cooling operation. Thermal inkjet uses pulses of electrical current to raise the temperature of the heaters to the superheat limit of the ink, which is typically around 300° C. for water based ink. At this temperature a high pressure vapour bubble is formed on the heater surface and expansion of the bubble forces ink out of the nozzle. Reduced energy input in thermal inkjet can be achieved through careful attention to parasitic losses in the heater contacts. Careful attention must also be given to the reliability of the heater contact design.

The heater is a film of resistive material deposited by a lithographic process of the type well known and understood in the field semiconductor fabrication. When the film is deposited on a non-planar topography, the thickness of the film varies substantially. If the film is deposited over a substantially vertical step, the film thickness on the vertical surface of the step is typically ~⅓ of the horizontal film thickness. A conductive strip of uniform width deposited over a vertical step will therefore have ~3 times the current density in the vertical section with ~9 times the volumetric heating rate (the heating rate is proportional to the square of current density). The temperature of relatively thin sections of film will far exceed 300° C. during the current pulse. This causes early failure due to, inter alia, oxidation and electro-migration.

One approach to avoid this is described in the Applicant's co-pending U.S. Ser. No. 11/246,687 filed Oct. 11, 2005, the contents of which are incorporated herein by cross reference. The current density in regions with non planar topography is reduced by making the width of the conductive strip much wider in that section. The additional width compensates for areas of reduced thickness and current density remains at safe levels.

Unfortunately, the electrical current funnels from the (laterally) wide contacts of the heater to the laterally much narrower resistive element that forms the vapour bubble. If the funnelling is done over a short distance, spikes in current density and hot spots can arise at or near the ends of the resistive elements, again causing early failure. Funnelling over a longer distance avoids hot spots but the parasitic resistance of the contact (i.e. non-bubble forming) portion of the heater increases, resulting in decreased efficiency.

Another technique for addressing excess current density is described in US patent publication 2008/0259,131 assigned to Lexmark International Inc. An additional low resistivity layer is deposited on top of the resistive thin film to 'short out' areas of the heater contacts deposited over non-planar topography. Volumetric heating rate is proportional to resistivity and hence the contacts sections stay relatively cool. The parasitic resistance and waste heat are low, as all but the active element of the heater is shorted by the low resistivity layer.

Unfortunately, both the resistive heater film and the low resistivity layer must be coated with an insulating layer to prevent contact with ink, or a corrosive galvanic cell will form (two dissimilar metals in contact in the presence of an electrolyte). Also, the traditional material for the low resistivity layer (aluminium) chemically corrodes if exposed to ink.

Coating with insulating layers increases the thermal mass that must be heated to the superheat limit to form a bubble, so this coating will increase the energy required to jet ink. As such, insulating coatings are contrary to energy efficient droplet ejection and therefore counter to self cooling operation.

A second drawback relates to patterning the low resistivity layer without damaging the underlying heater material film. Dry etches are preferred in most semiconductor fabrication facilities, but dry etches with suitable selectivity between the two materials, both likely to contain aluminium, are unlikely to exist. Finding a wet etch that can etch the low resistivity layer without etching the resistive thin film is likely to be easier, but that would impose significant constraints on the selection of the heater film material. These selection constraints may be contrary to the goal of self cooling, which requires thin film materials with particular properties, such as very high oxidation resistance.

SUMMARY OF THE INVENTION

According to a first aspect, the present invention provides an inkjet printhead comprising:

a supporting substrate;

a conductive layer deposited in a pattern on one side of the supporting substrate;

an insulating layer deposited such that the conductive layer is between the insulating layer and the supporting substrate;

an ink chamber supported on the supporting substrate such that the conductive layer is between the ink chambers and the supporting substrate;

a nozzle in fluid communication with the ink chamber;

a heater on the insulating layer configured to vaporize some ink in the ink chamber such that a droplet of ink is ejected through the nozzle, the heater having a resistive element extending between a pair of contacts; and, at least one metallic via in each of the contacts respectively, the metallic vias extending through the insulating layer to establish an electrical connection between the conductive layer and the contacts; wherein, the insulating layer has a planar surface on which the heater is supported.

The invention is predicated on the realisation that the areas of high current density can be avoided by supporting the heater on a planar surface and electrically connecting the contacts to the underlying CMOS with metallic vias.

Preferably, the resistive element is an elongate strip extending between the contacts and the at least one metallic via in each of the contacts has a width substantially equal to the width of the strip.

Preferably, the metallic vias contain tungsten, copper or aluminium.

Preferably, one end of each of the vias is planar and co-planar with the planar surface on which the heater is supported.

Preferably, the heater is less than 2 microns thick and in a further preferred form, the heater is less than 1 micron thick.

Preferably, the heater is an alloy containing titanium and aluminium.

Preferably, the thickness of the insulating layer between the conductive layer and the contacts is between 1.2 microns and 1.8 microns.

Preferably, the insulating layer is a laminate of different materials. In a further preferred form, the laminate is a layer of silicon nitride between two outer layers of silicon dioxide.

Preferably, the conductive layer is a top-most metal layer in a stack of CMOS layers on the supporting substrate. Preferably, the CMOS layers provide the heater with an electrical pulse of energy to generate the vapour bubble, the electrical pulse generating less than 250 nano-joules. Preferably, the CMOS has a drive transistor through which the electrical pulse flows, the drive transistor having a drive voltage less than 5V.

According to a second aspect, the present invention provides a method of fabricating an inkjet printhead comprising the steps of:

providing a supporting substrate;

depositing and patterning a conductive layer on one side of the supporting substrate;

depositing an insulating layer on the conductive layer;

etching holes through the insulating layer to the conductive layer;

depositing metal in the holes to form metallic vias;

planarizing an outer surface of the insulating layer and one end of each of the metallic vias respectively; and, depositing and patterning a layer of heater material on the outer surface to form a heater with a resistive element extending between a pair of contacts; wherein, the metallic vias electrically connect the contacts to the conductive layer.

Preferably, the step of planarizing the outer surface is a chemical, mechanical planarization process.

Preferably, the resistive element is an elongate strip extending between the contacts and the at least one metallic via in each of the contacts has a width substantially equal to the width of the strip.

Preferably, the metallic vias contain tungsten, copper or aluminium.

Preferably, one end of each of the vias is planar and coplanar with the planar surface on which the heater is supported.

Preferably, the heater is less than 2 microns thick and in a further preferred form, the heater is less than 1 micron thick.

Preferably, the heater is an alloy containing titanium and aluminium.

Preferably, the thickness of the insulating layer between the conductive layer and the contacts is between 1.2 microns and 1.8 microns.

Preferably, the insulating layer is a laminate of different materials. In a further preferred form, the laminate is a layer of silicon nitride between two outer layers of silicon dioxide.

Preferably, the conductive layer is a top-most metal layer in a stack of CMOS layers on the supporting substrate. Preferably, the CMOS layers provide the heater with an electrical pulse of energy to generate the vapour bubble, the electrical pulse generating less than 250 nano-joules. Preferably, the CMOS has a drive transistor through which the electrical pulse flows, the drive transistor having a drive voltage less than 5V.

The printhead according to the invention comprises a plurality of nozzles, as well as a chamber and one or more heater elements corresponding to each nozzle. The smallest repeating units of the printhead will have an ink supply inlet feeding ink to one or more chambers. The entire nozzle array is formed by repeating these individual units. Such an individual unit is referred to herein as a "unit cell".

Also, the term "ink" is used to signify any ejectable liquid, and is not limited to conventional inks containing colored dyes. Examples of non-colored inks include fixatives, infrared absorber inks, functionalized chemicals, adhesives, biological fluids, medicaments, water and other solvents, and so on. The ink or ejectable liquid also need not necessarily be a strictly a liquid, and may contain a suspension of solid particles.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
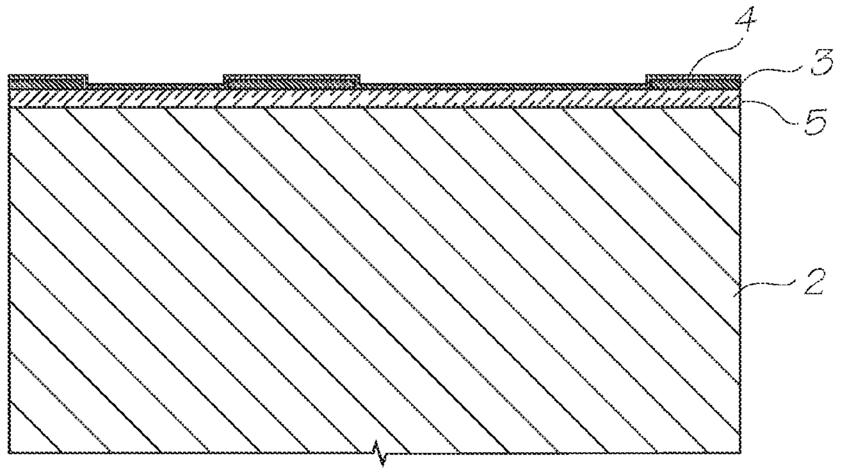
FIG. 1 shows a partially fabricated unit cell of the MEMS nozzle array on a printhead according to the present invention, the unit cell being section along A-A of FIG. 3.

In the description than follows, corresponding reference numerals relate to corresponding parts. For convenience, the features indicated by each reference numeral are listed below.

SERIES PARTS LIST

| | |
|---|---|
| 1. | Nozzle Unit Cell |
| 2. | Silicon Wafer |
| 3. | Topmost Aluminium Metal Layer in the CMOS metal layers |
| 4. | Passivation Layer |
| 5. | CVD Oxide Layer |
| 6. | Ink Inlet Opening in Topmost Aluminium Metal Layer 3. |
| 7. | Pit Opening in Topmost Aluminium Metal Layer 3. |
| 8. | Pit |
| 9. | Electrodes |
| 10. | SAC1 Photoresist Layer |
| 11. | Heater Material (TiAlN) |
| 12. | Thermal Actuator |
| 13. | Photoresist Layer |
| 14. | Ink Inlet Opening Etched Through Photo Resist Layer |
| 15. | Ink Inlet Passage |
| 16. | SAC2 Photoresist Layer |
| 17. | Chamber Side Wall Openings |
| 18. | Front Channel Priming Feature |
| 19. | Barrier Formation at Ink Inlet |
| 20. | Chamber Roof Layer |
| 21. | Roof |
| 22. | Sidewalls |
| 23. | Ink Conduit |
| 24. | Nozzle Chambers |
| 25. | Elliptical Nozzle Rim |
| | 25(a) Inner Lip |
| | 25(b) Outer Lip |
| 26. | Nozzle Aperture |
| 27. | Ink Supply Channel |
| 28. | Contacts |
| 29. | Heater Element. |
| 30. | Bubble cage |
| 32. | bubble retention structure |
| 34. | ink permeable structure |
| 36. | bleed hole |
| 38. | ink chamber |
| 40. | dual row filter |
| 42. | paper dust |
| 44. | ink gutters |
| 46. | gap between SAC1 and trench sidewall |
| 48. | trench sidewall |
| 50. | raised lip of SAC1 around edge of trench |
| 52. | thinner inclined section of heater material |
| 54. | cold spot between series connected heater elements |
| 56. | nozzle plate |
| 58. | columnar projections |
| 60. | sidewall ink opening |
| 62. | ink refill opening |
| 64. | CMOS inclusing drive FETs |
| 66. | first silicon dioxide passivation layer |
| 68. | silicon nitride passivation layer |
| 70. | second silicon nitride passivation layer |
| 72. | via holes etched through the insulating layer |
| 74. | planarized heater support surface |

-continued

| | |
|---|---|
| 76. | metallic vias |
| 78. | insulating laminate |

MEMS Manufacturing Process

Figure 2:
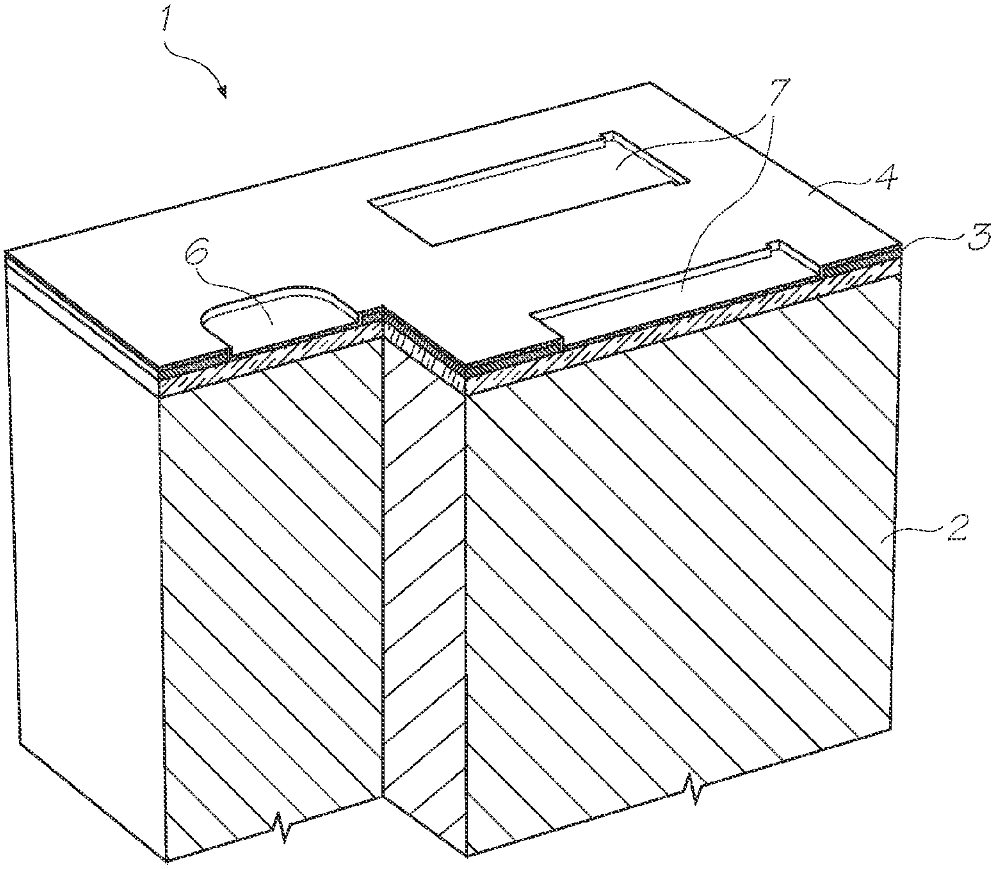
FIG. 2 shows a perspective of the partially fabricated unit cell of FIG. 1.

The MEMS manufacturing process builds up nozzle structures on a silicon wafer supporting substrate, after the completion of CMOS processing. FIG. 2 is a cutaway perspective view of a nozzle unit cell 100 after the completion of CMOS processing and before MEMS processing.

During CMOS processing of the wafer, four metal layers are deposited onto a silicon wafer 2, with the metal layers being interspersed between interlayer dielectric (ILD) layers. The four metal layers are referred to as M1, M2, M3 and M4 layers and are built up sequentially on the wafer during CMOS processing. These CMOS layers provide all the drive circuitry and logic for operating the printhead.

In the completed printhead, each heater element actuator is connected to the CMOS via a pair of electrodes defined in the outermost M4 layer. Hence, the M4 CMOS layer is the foundation for subsequent MEMS processing of the wafer. The M4 layer also defines bonding pads along a longitudinal edge of each printhead integrated circuit. These bonding pads (not shown) allow the CMOS to be connected to a microprocessor via wire bonds extending from the bonding pads.

FIGS. 1 and 2 show the aluminium M4 layer 3 having a passivation layer 4 deposited thereon (only MEMS features of the M4 layer are shown in these Figures; the main CMOS features of the M4 layer are positioned outside the nozzle unit cell). The M4 layer 3 has a thickness of 1 micron and is itself deposited on a 2 micron layer of CVD oxide 5. As shown in FIGS. 1 and 2, the M4 layer 3 has an ink inlet opening 6 and pit openings 7. These openings define the positions of the ink inlet and pits formed subsequently in the MEMS process.

Before MEMS processing of the unit cell 1 begins, bonding pads along a longitudinal edge of each printhead integrated circuit are defined by etching through the passivation layer 4. This etch reveals the M4 layer 3 at the bonding pad positions. The nozzle unit cell 1 is completely masked with photoresist for this step and, hence, is unaffected by the etch.

Figure 3:
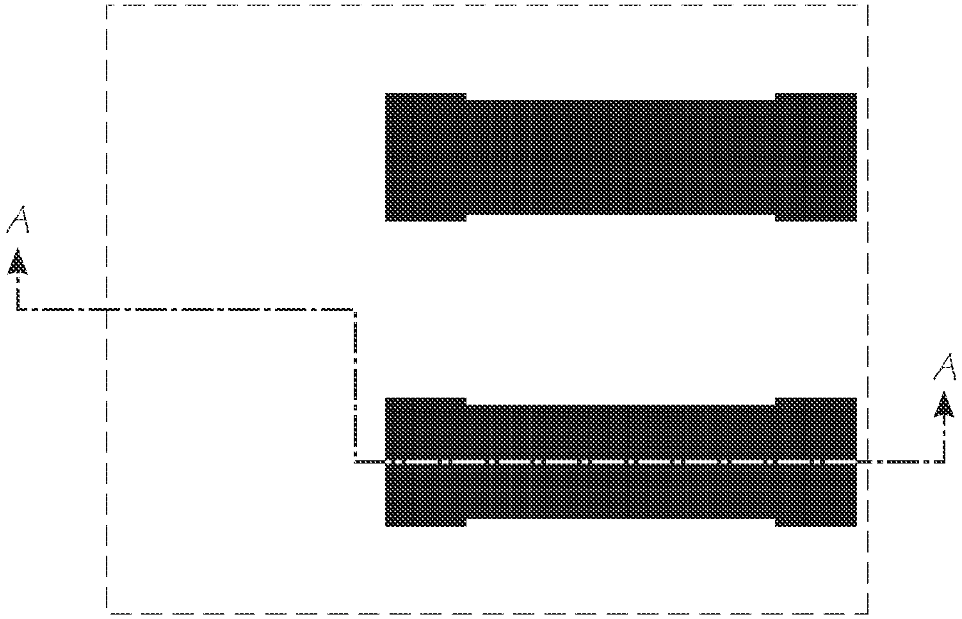
FIG. 3 shows the mark associated with the etch of the heater element trench.
Figure 4:
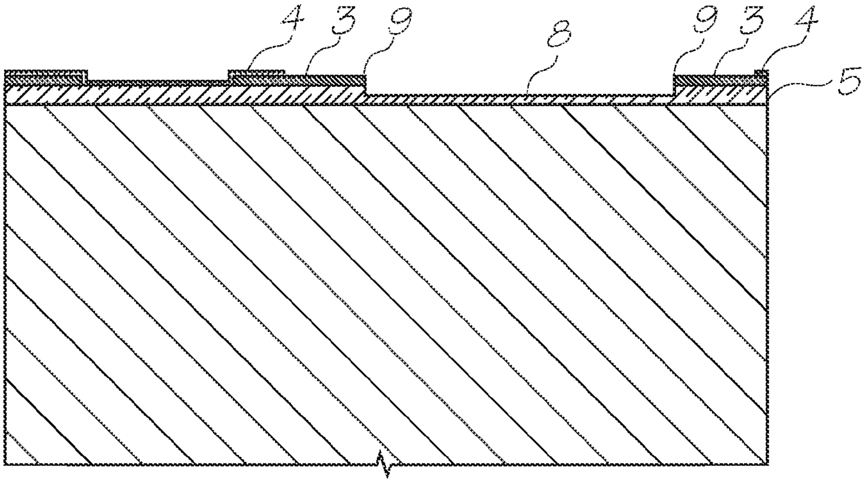
FIG. 4 is a sectioned view of the unit cell after the etch of the trench.
Figure 5:
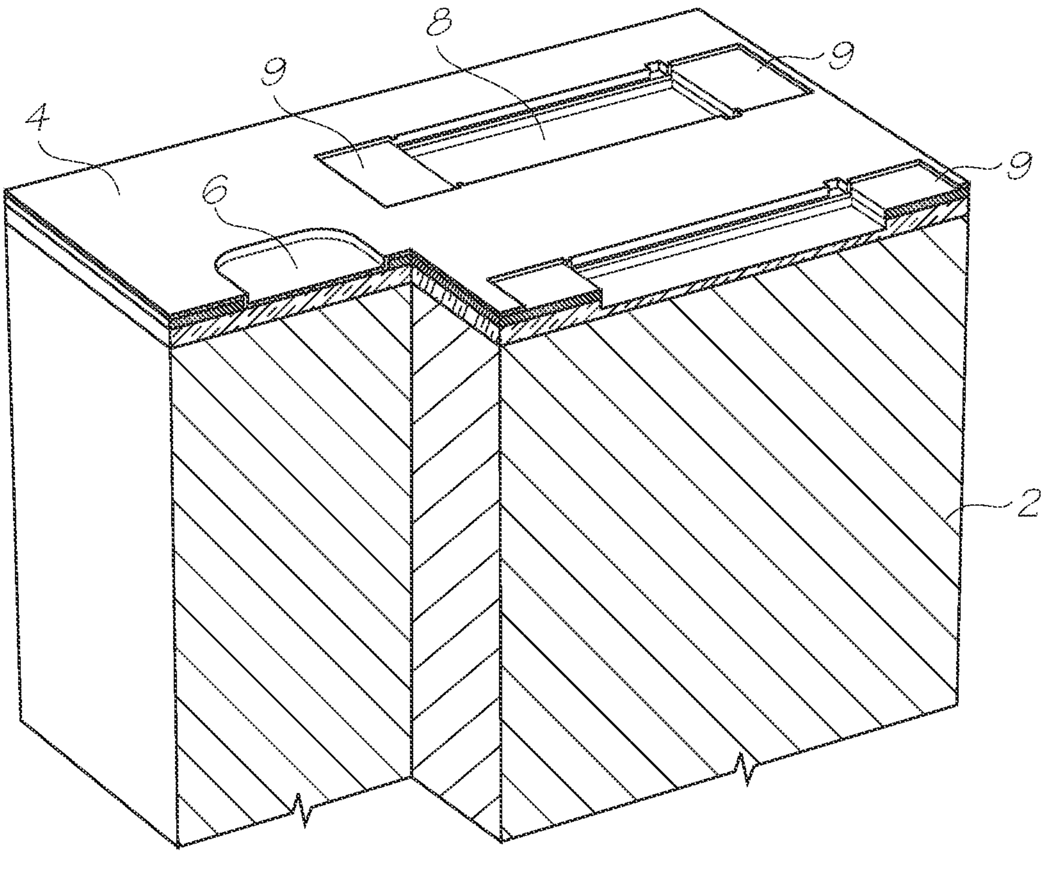
FIG. 5 is a perspective view of the unit cell shown in FIG. 4.

Turning to FIGS. 3 to 5, the first stage of MEMS processing etches a pit 8 through the passivation layer 4 and the CVD oxide layer 5. This etch is defined using a layer of photoresist (not shown) exposed by the dark tone pit mask shown in FIG. 3. The pit 8 has a depth of 2 microns, as measured from the top of the M4 layer 3. At the same time as etching the pit 8, electrodes 9 are defined on either side of the pit by partially revealing the M4 layer 3 through the passivation layer 4. In the completed nozzle, a heater element is suspended across the pit 8 between the electrodes 9.

In the next step (FIGS. 6 to 8), the pit 8 is filled with a first sacrificial layer ("SAC1") of photoresist 10. A 2 micron layer of high viscosity photoresist is first spun onto the wafer and then exposed using the dark tone mask shown in FIG. 6. The SAC1 photoresist 10 forms a scaffold for subsequent deposition of the heater material across the electrodes 9 on either side of the pit 8. Consequently, it is important the SAC1 photoresist 10 has a planar upper surface that is flush with the upper surface of the electrodes 9. At the same time, the SAC1 photoresist must completely fill the pit 8 to avoid 'stringers' of conductive heater material extending across the pit and shorting out the electrodes 9.

Typically, when filling trenches with photoresist, it is necessary to expose the photoresist outside the perimeter of the trench in order to ensure that photoresist fills against the walls of the trench and, therefore, avoid 'stringers' in subsequent deposition steps. However, this technique results in a raised (or spiked) rim of photoresist around the perimeter of the trench. This is undesirable because in a subsequent deposition step, material is deposited unevenly onto the raised rim—vertical or angled surfaces on the rim will receive less deposited material than the horizontal planar surface of the photoresist filling the trench.

Figure 6:
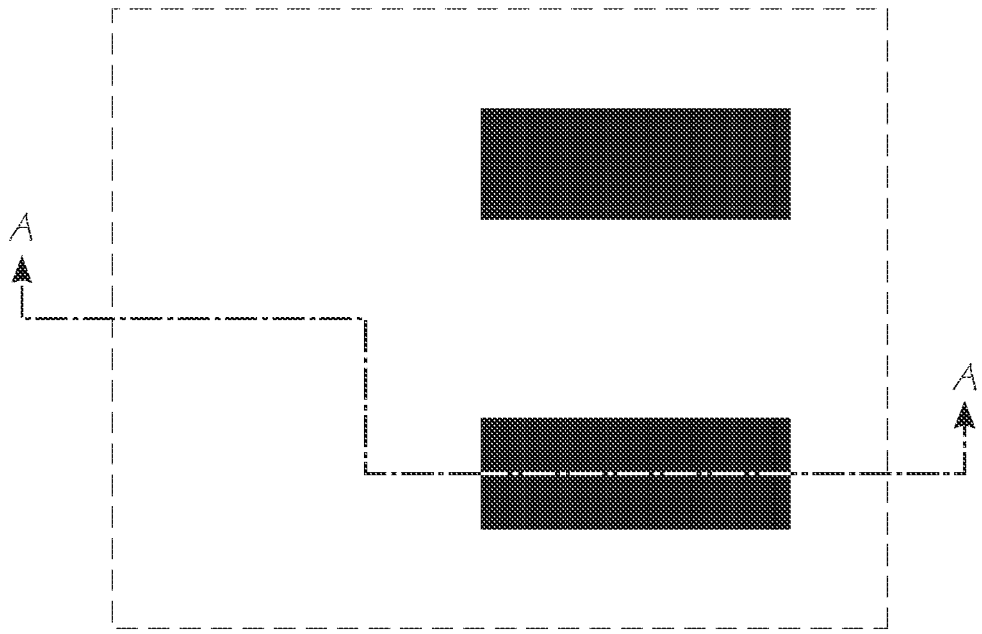
FIG. 6 is the mask associated with the deposition of sacrificial photoresist shown in FIG. 7.
Figure 7:
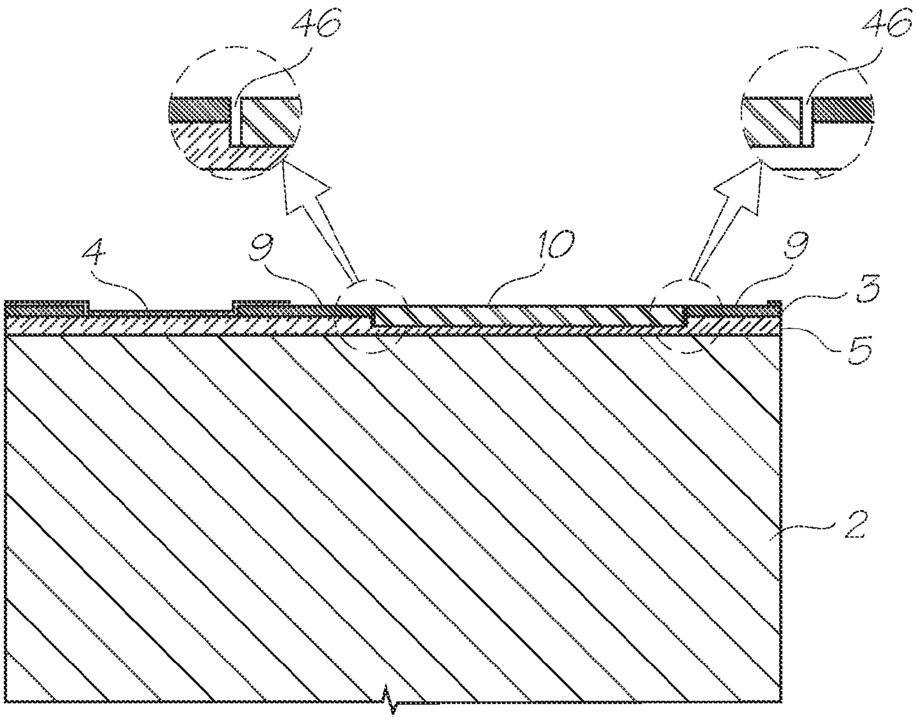
FIG. 7 shows the unit cell after the deposition of sacrificial photoresist trench, with partial enlargements of the gaps between the edges of the sacrificial material and the side walls of the trench.
Figure 8:
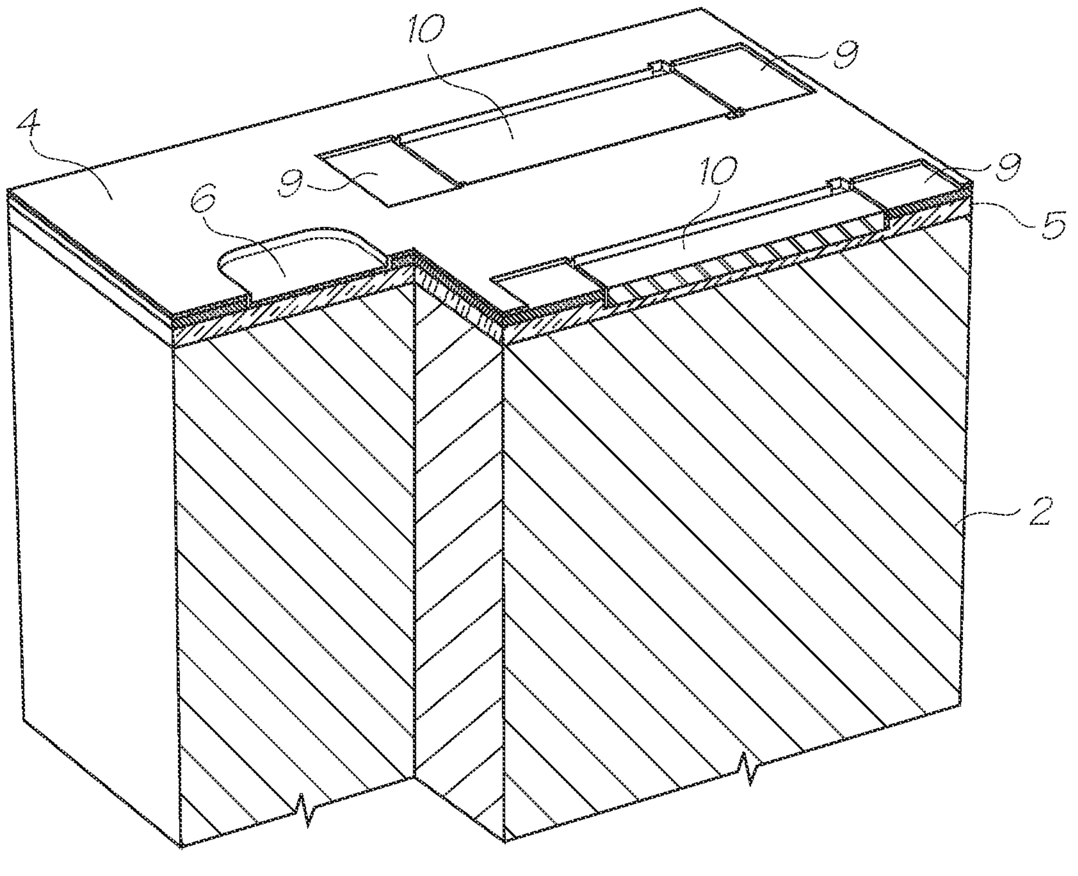
FIG. 8 is a perspective of the unit cell shown in FIG. 7.

As shown in FIG. 7, the present process deliberately exposes the SAC1 photoresist 10 inside the perimeter walls of the pit 8 using the mask shown in FIG. 6.

Figure 9:
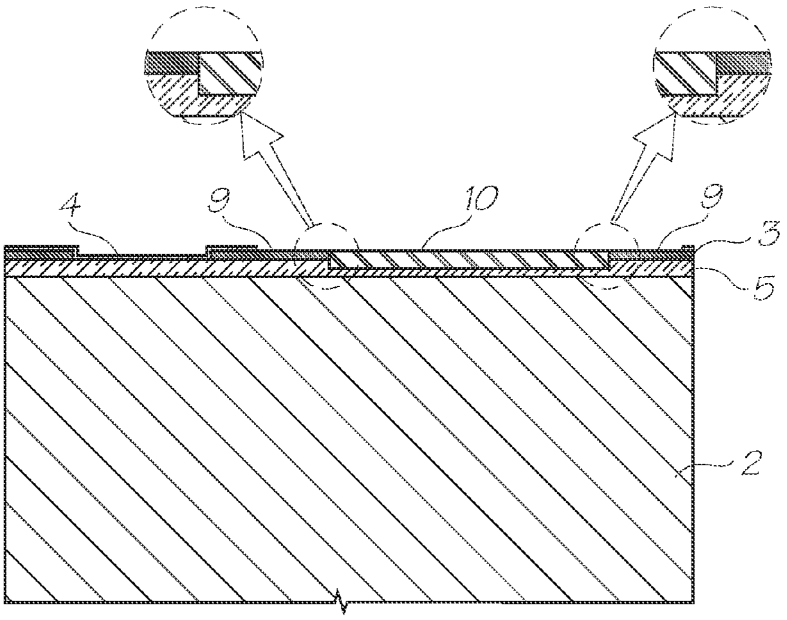
FIG. 9 shows the unit cell following the reflow of the sacrificial photoresist to close the gaps along the side walls of the trench.
Figure 10:
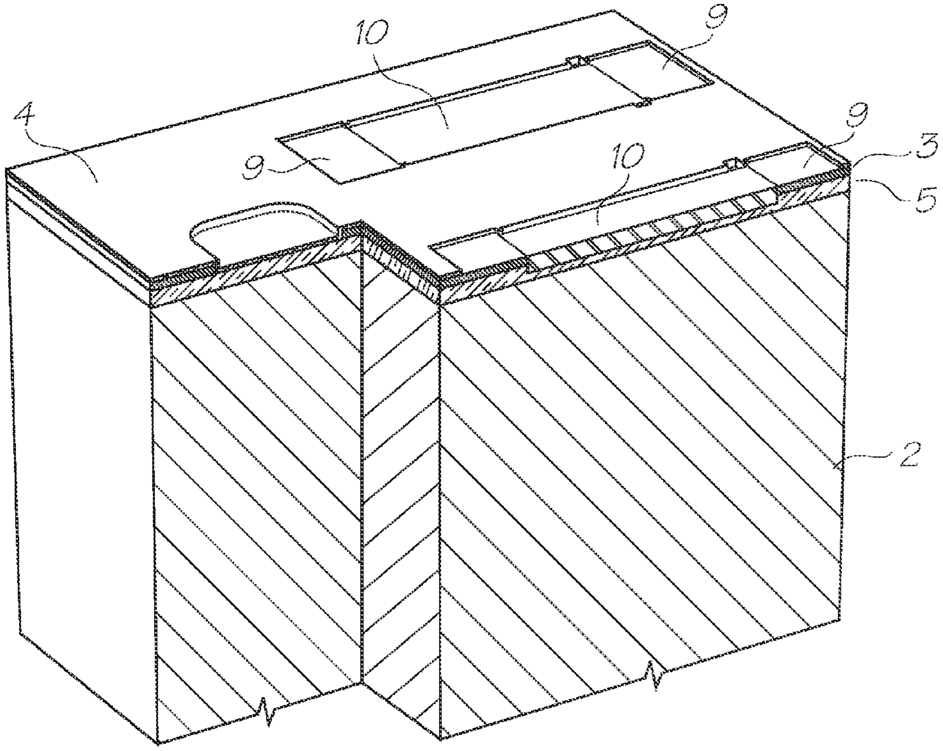
FIG. 10 is a perspective of the unit cell shown in FIG. 9.

After exposure of the SAC1 photoresist 10, the photoresist is reflowed by heating. Reflowing the photoresist allows it to flow to the walls of the pit 8, filling it exactly. FIGS. 9 and 10 show the SAC1 photoresist 10 after reflow. The photoresist has a planar upper surface and meets flush with the upper surface of the M4 layer 3, which forms the electrodes 9. Following reflow, the SAC1 photoresist 10 is U.V. cured and/or hardbaked to avoid any reflow during the subsequent deposition step of heater material.

Figure 11:
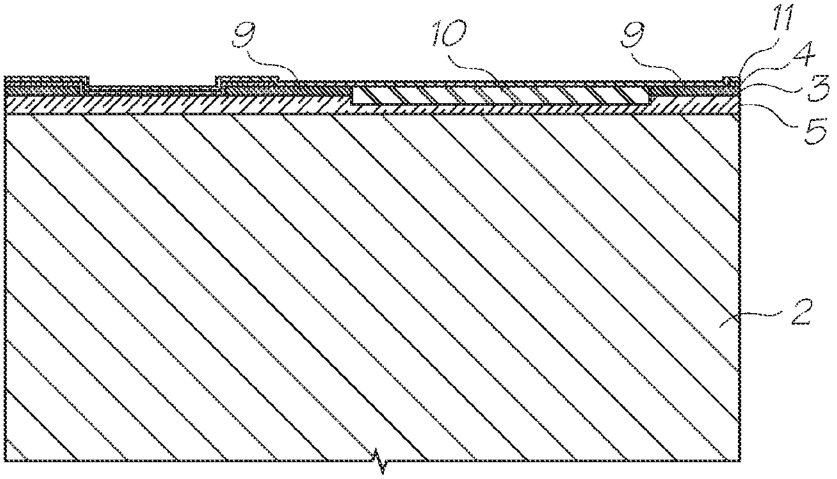
FIG. 11 is a section view showing the deposition of the heater material layer.
Figure 12:
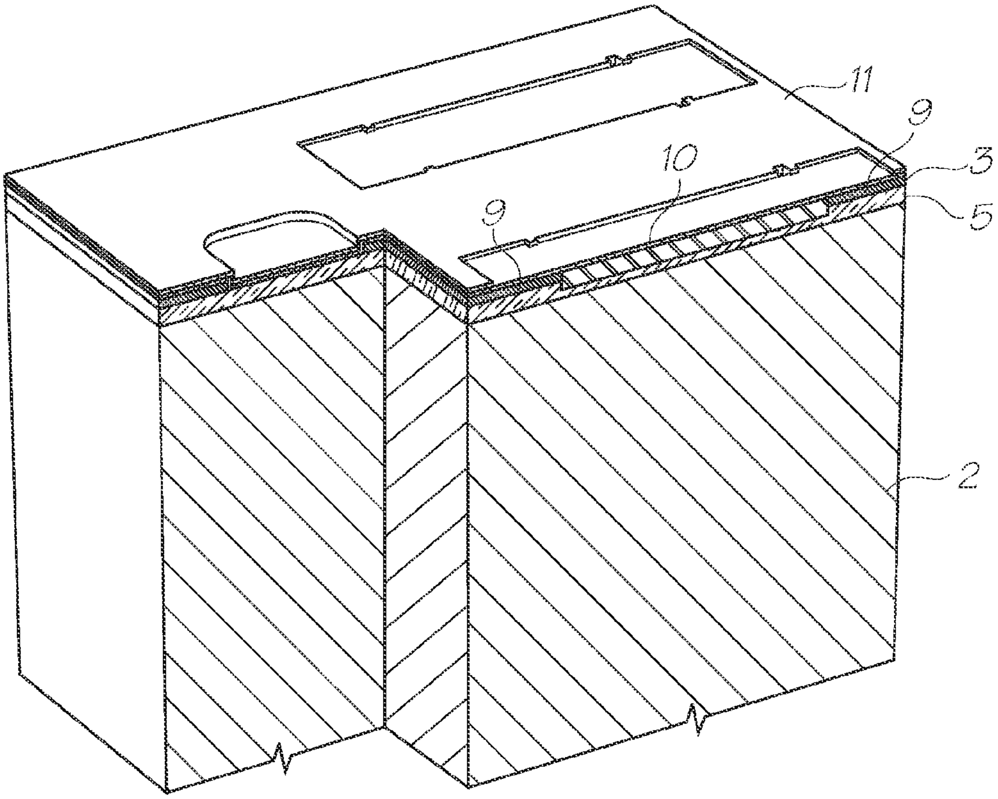
FIG. 12 is a perspective of the unit cell shown in FIG. 11.

FIGS. 11 and 12 show the unit cell after deposition of about 0.5 microns (usually 0.5 microns to 0.7 microns depending on the number and type heater material seed layers used) of heater material 11 onto the SAC1 photoresist 10. Due to the reflow process described above, the heater material 11 is deposited evenly and in a planar layer over the electrodes 9 and the SAC1 photoresist 10. The heater material may be comprised of any suitable conductive material, such as TiAl, TiN, TiAlN, TiAlSiN etc. A typical heater material deposition process may involve sequential deposition of a 100 Å seed layer of TiAl, a 2500 Å layer of TiAlN, a further 100 Å seed layer of TiAl and finally a further 2500 Å layer of TiAlN.

Figure 13:
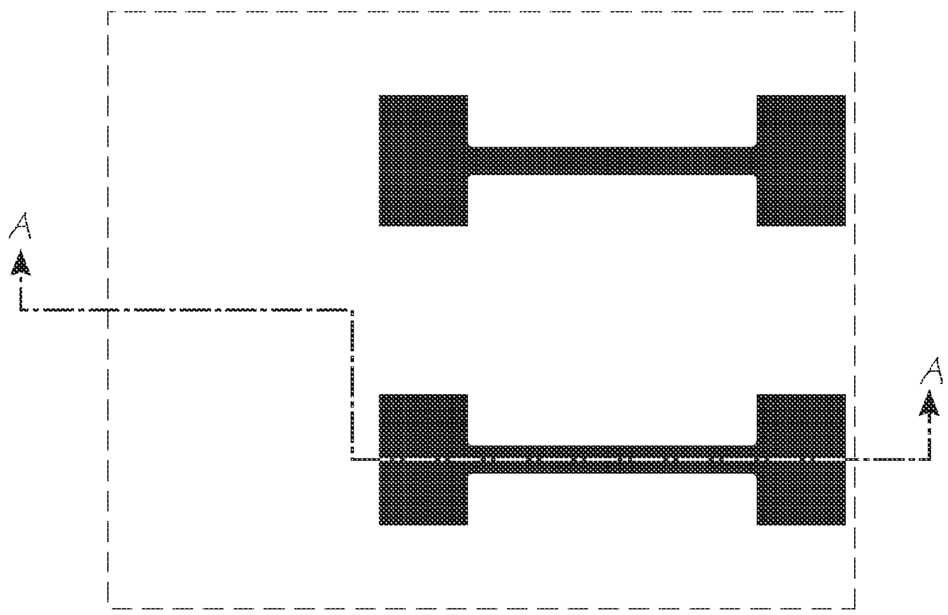
FIG. 13 is the mask associated with the metal etch of the heater material shown in FIG. 14.
Figure 14:
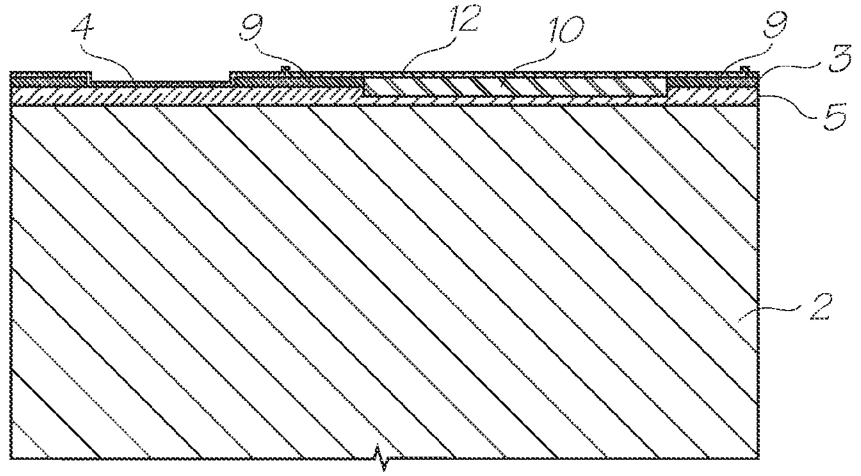
FIG. 14 is a section view showing the metal etch to shape the heater actuators.
Figure 15:
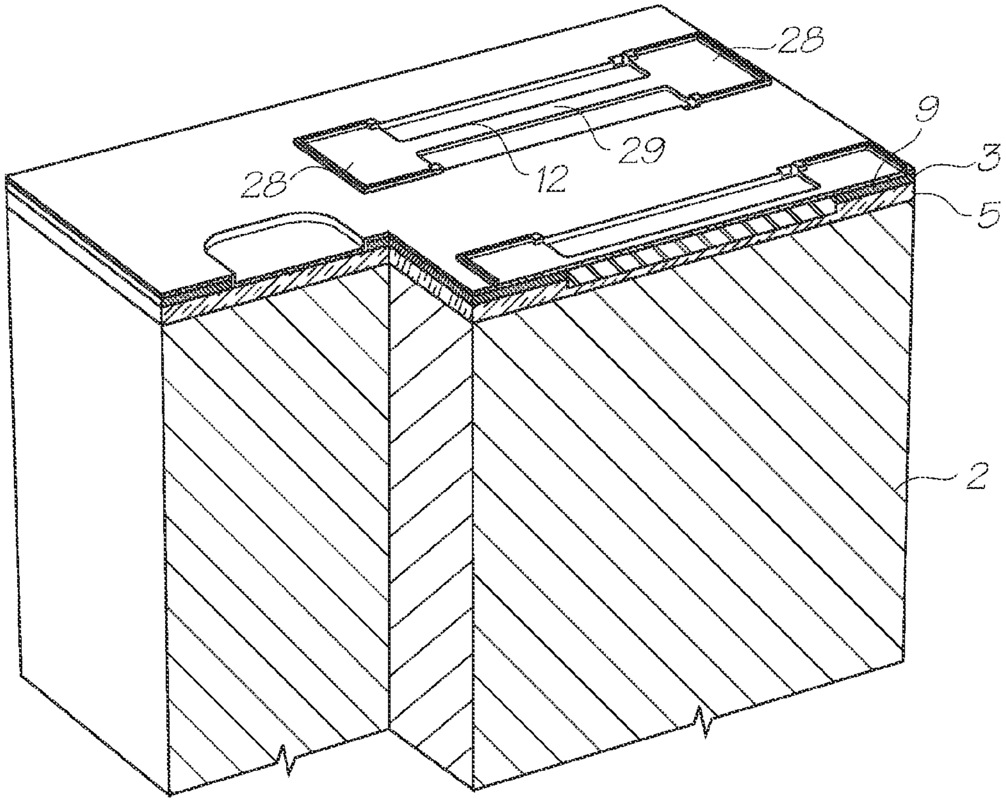
FIG. 15 is a perspective of the unit cell shown in FIG. 14.

Referring to FIGS. 13 to 15, in the next step, the layer of heater material 11 is etched to define the thermal actuator 12. Each actuator 12 has contacts 28 that establish an electrical connection to respective electrodes 9 on either side of the SAC1 photoresist 10. A heater element 29 spans between its corresponding contacts 28.

This etch is defined by a layer of photoresist (not shown) exposed using the dark tone mask shown in FIG. 13. As shown in FIG. 15, the heater element 12 is a linear beam spanning between the pair of electrodes 9. However, the heater element 12 may alternatively adopt other configurations, such as those described in U.S. Pat. No. 6,755,509, the content of which is herein incorporated by reference. For example, heater element 29 configurations having a central void may be advantageous for minimizing the deleterious effects of cavitation forces on the heater material when a bubble collapses during ink ejection. Other forms of cavitation protection may be adopted such as 'bubble venting' and the use of self passivating materials. These cavitation management techniques are discussed in detail in U.S. patent application Ser. No. 11/097,308.

In the next sequence of steps, an ink inlet for the nozzle is etched through the passivation layer 4, the oxide layer 5 and the silicon wafer 2. During CMOS processing, each of the metal layers had an ink inlet opening (see, for example, opening 6 in the M4 layer 3 in FIG. 1) etched therethrough in preparation for this ink inlet etch. These metal layers, together with the interspersed ILD layers, form a seal ring for the ink inlet, preventing ink from seeping into the CMOS layers.

Figure 16:
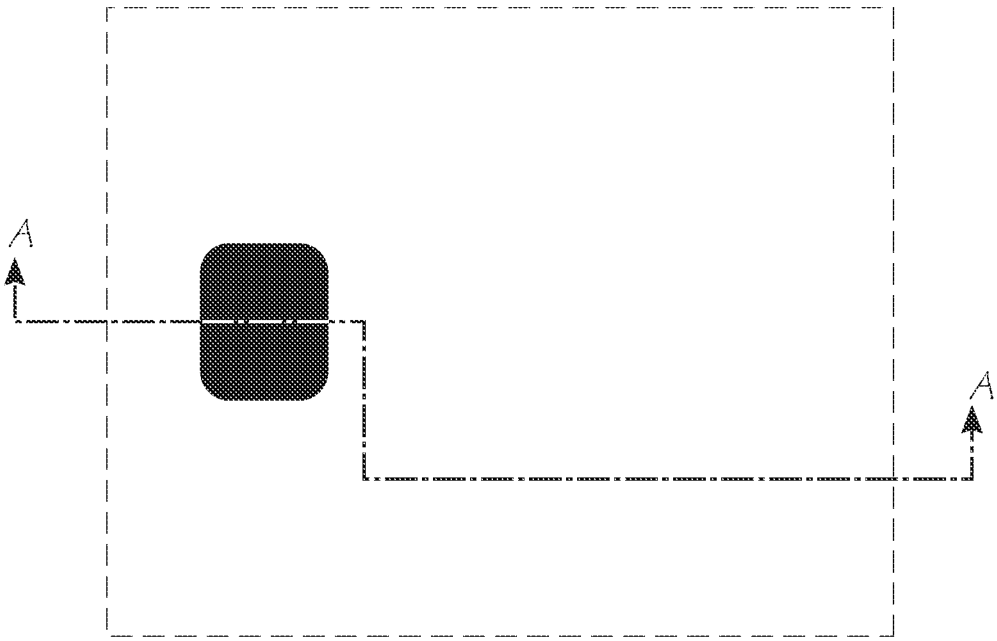
FIG. 16 is the mask associated with the etch shown in FIG. 17.
Figure 17:
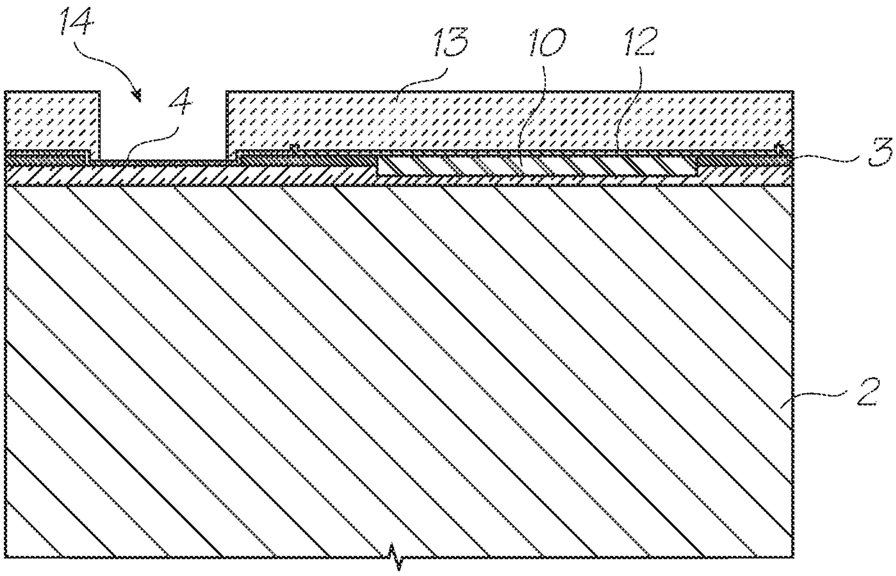
FIG. 17 shows the deposition of the photoresist layer and subsequent etch of the ink inlet to the passivation layer on top of the CMOS drive layers.
Figure 18:
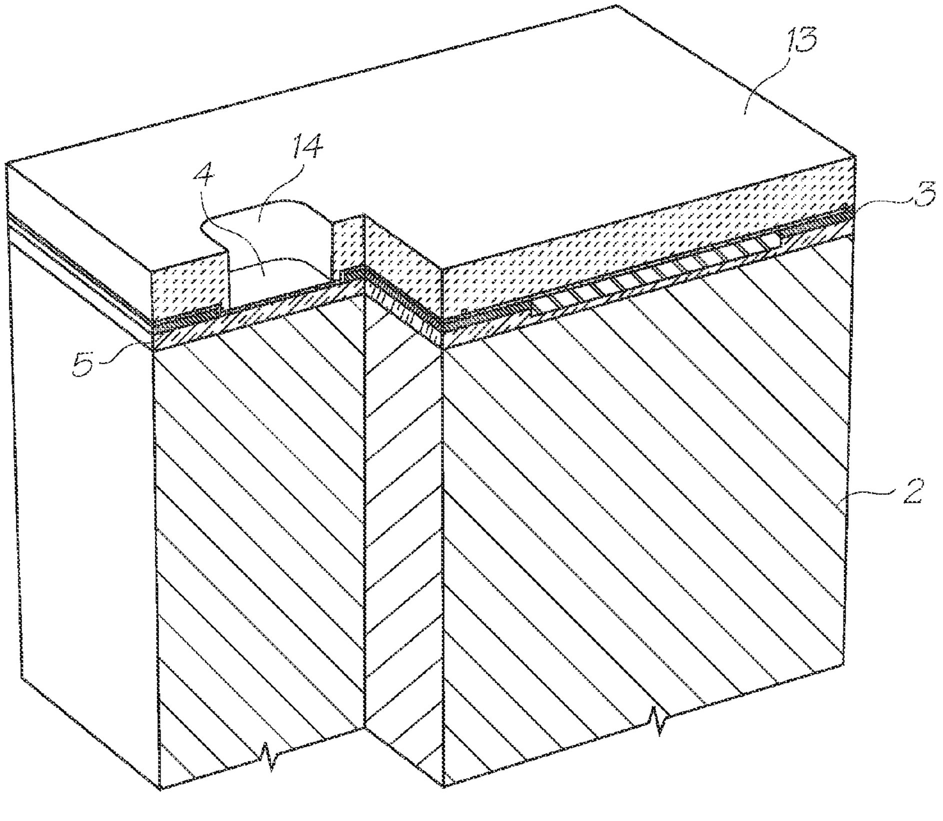
FIG. 18 is a perspective of the unit cell shown in FIG. 17.

Referring to FIGS. 16 to 18, a relatively thick layer of photoresist 13 is spun onto the wafer and exposed using the dark tone mask shown in FIG. 16. The thickness of photoresist 13 required will depend on the selectivity of the deep reactive ion etch (DRIE) used to etch the ink inlet. With an ink inlet opening 14 defined in the photoresist 13, the wafer is ready for the subsequent etch steps.

Figure 19:
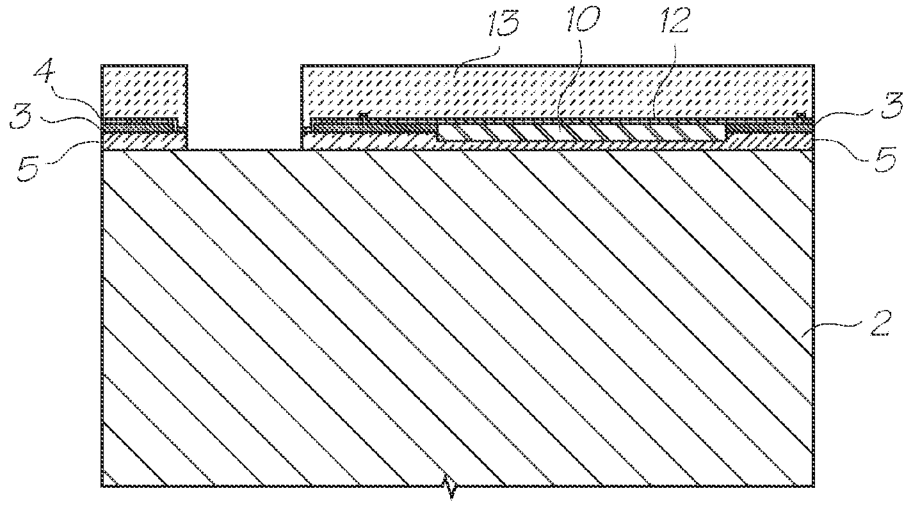
FIG. 19 shows the oxide etch through the passivation and CMOS layers to the underlying silicon wafer.
Figure 20:
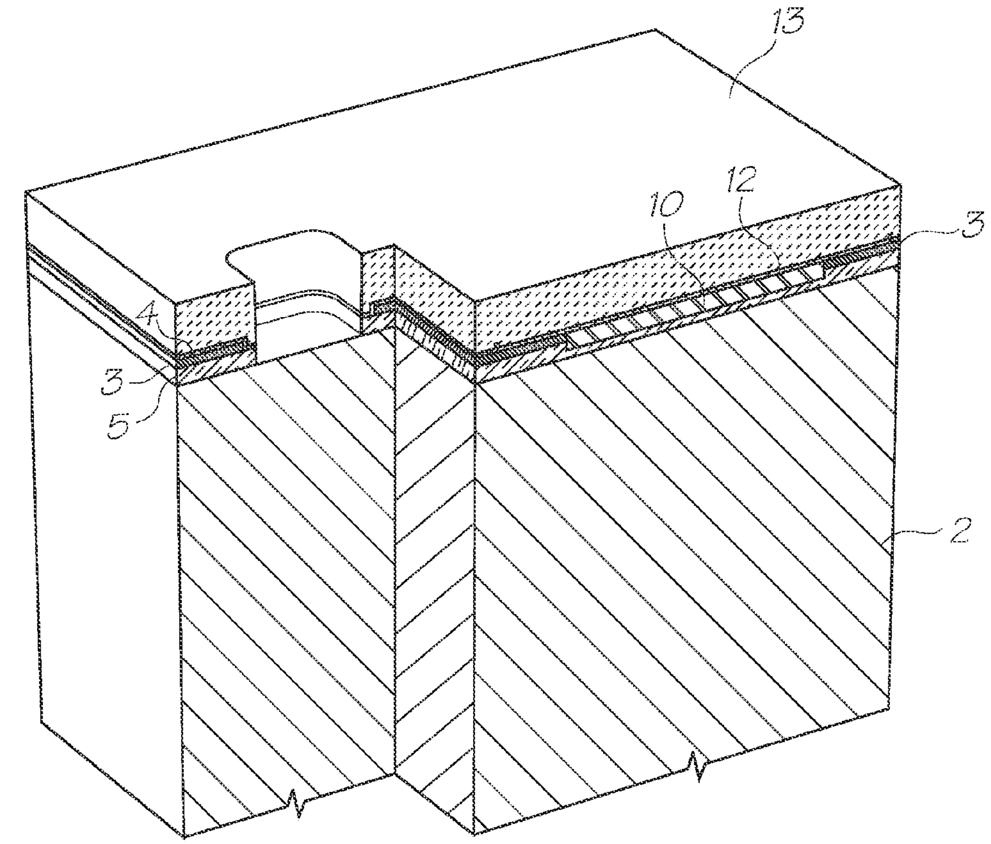
FIG. 20 is a perspective of the unit cell shown in FIG. 19.

In the first etch step (FIGS. 19 and 20), the dielectric layers (passivation layer 4 and oxide layer 5) are etched through to the silicon wafer below. Any standard oxide etch (e.g. $O_2/C_4F_8$ plasma) may be used.

Figure 21:
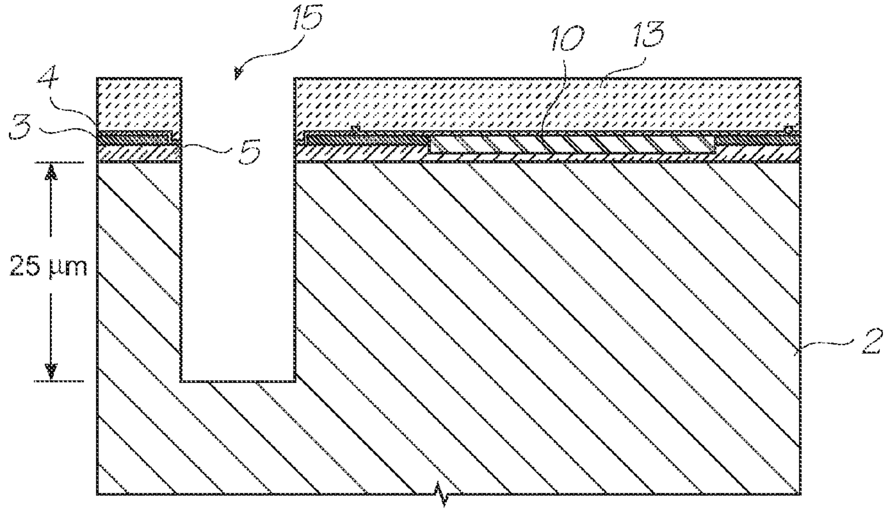
FIG. 21 is the deep anisotropic etch of the ink inlet into the silicon wafer.
Figure 22:
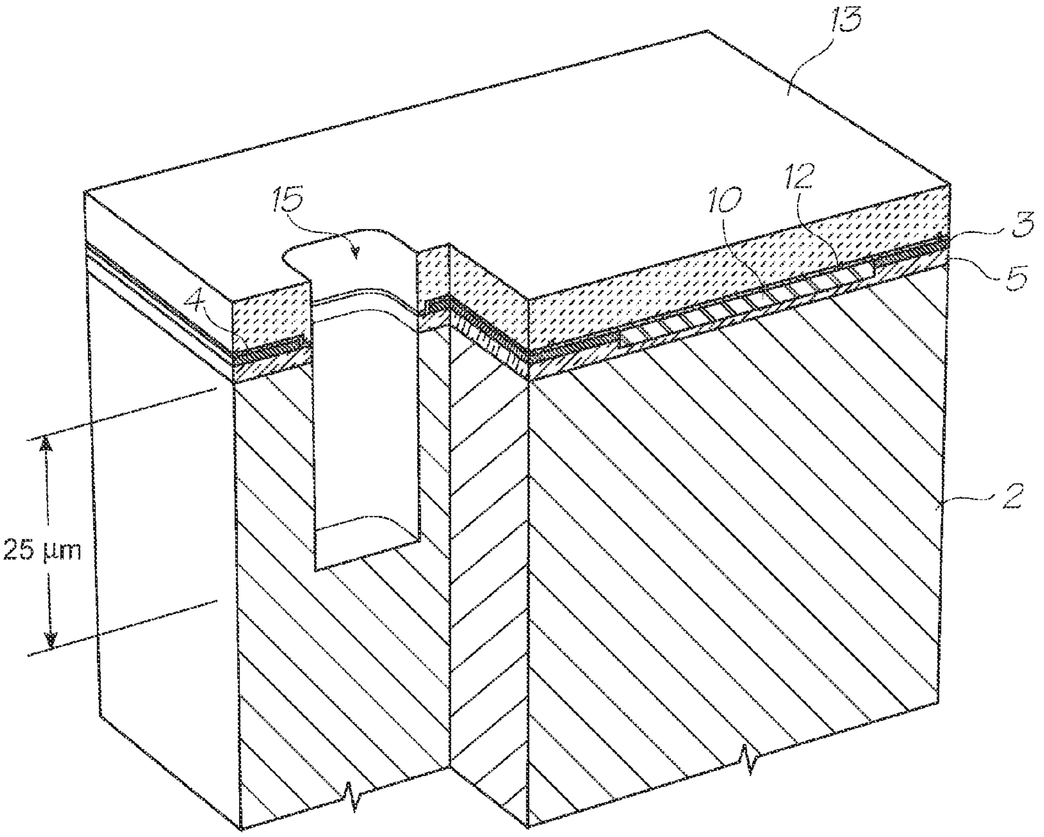
FIG. 22 is a perspective of the unit cell shown in FIG. 21.

In the second etch step (FIGS. 21 and 22), an ink inlet 15 is etched through the silicon wafer 2 to a depth of 25 microns, using the same photoresist mask 13. Any standard anisotropic DRIE, such as the Bosch etch (see U.S. Pat. Nos. 6,501,893 and 6,284,148) may be used for this etch. Following etching of the ink inlet 15, the photoresist layer 13 is removed by plasma ashing.

Figure 23:
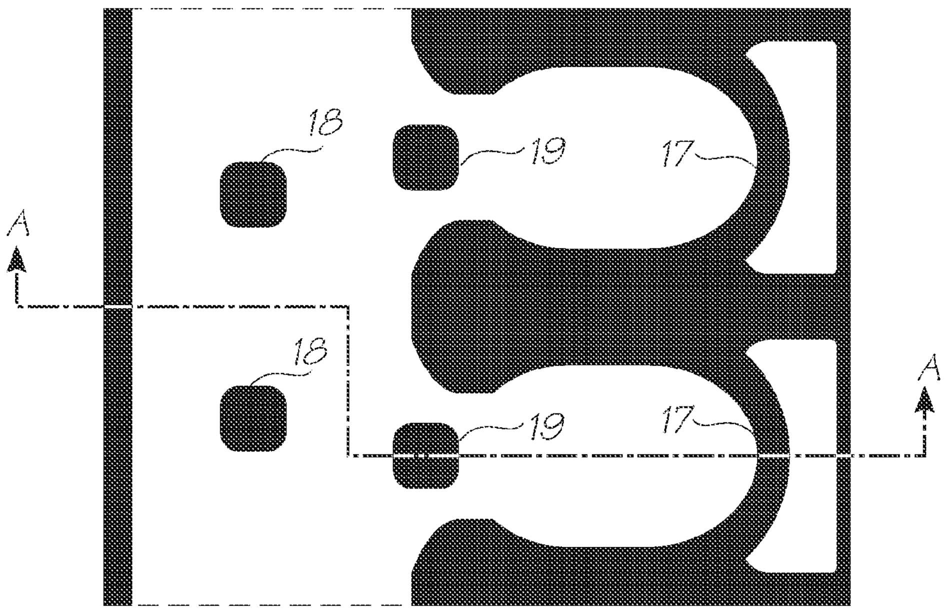
FIG. 23 is the mask associated with the photoresist etch shown in FIG. 24.
Figure 24:
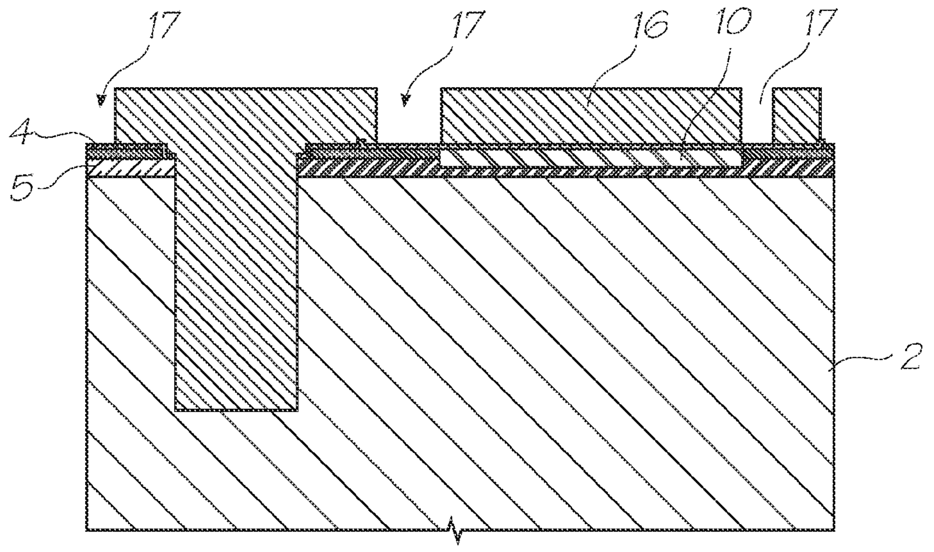
FIG. 24 shows the photoresist etch to form openings for the chamber roof and side walls.
Figure 25:
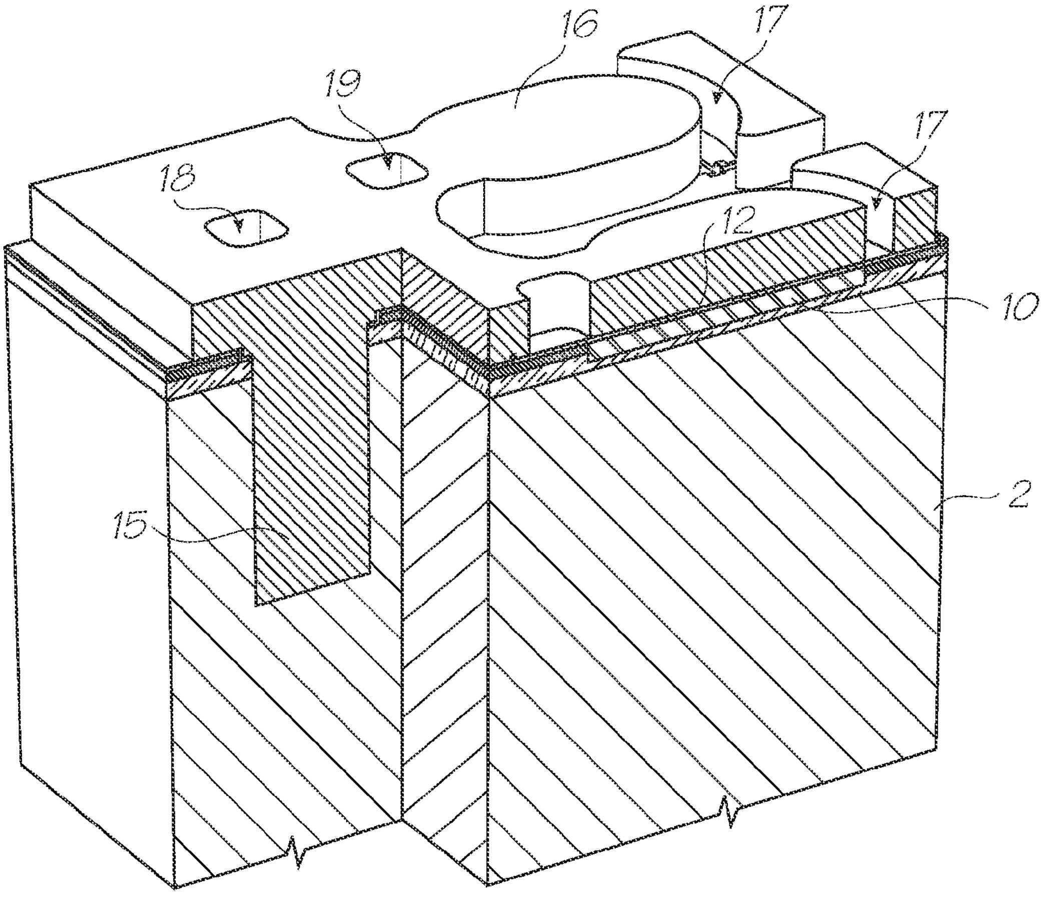
FIG. 25 is a perspective of the unit cell shown in FIG. 24.

In the next step, the ink inlet 15 is plugged with photoresist and a second sacrificial layer ("SAC2") of photoresist 16 is built up on top of the SAC1 photoresist 10 and passivation layer 4. The SAC2 photoresist 16 will serve as a scaffold for subsequent deposition of roof material, which forms a roof and sidewalls for each nozzle chamber. Referring to FIGS. 23 to 25, a ~6 micron layer of high viscosity photoresist is spun onto the wafer and exposed using the dark tone mask shown in FIG. 23.

As shown in FIGS. 23 and 25, the mask exposes sidewall openings 17 in the SAC2 photoresist 16 corresponding to the positions of chamber sidewalls and sidewalls for an ink conduit. In addition, openings 18 and 19 are exposed adjacent the plugged inlet 15 and nozzle chamber entrance respectively. These openings 18 and 19 will be filled with roof material in the subsequent roof deposition step and provide unique advantages in the present nozzle design. Specifically, the openings 18 filled with roof material act as priming features, which assist in drawing ink from the inlet 15 into each nozzle chamber. This is described in greater detail below. The openings 19 filled with roof material act as filter structures and fluidic cross talk barriers. These help prevent air bubbles from entering the nozzle chambers and diffuses pressure pulses generated by the thermal actuator 12.

Figure 26:
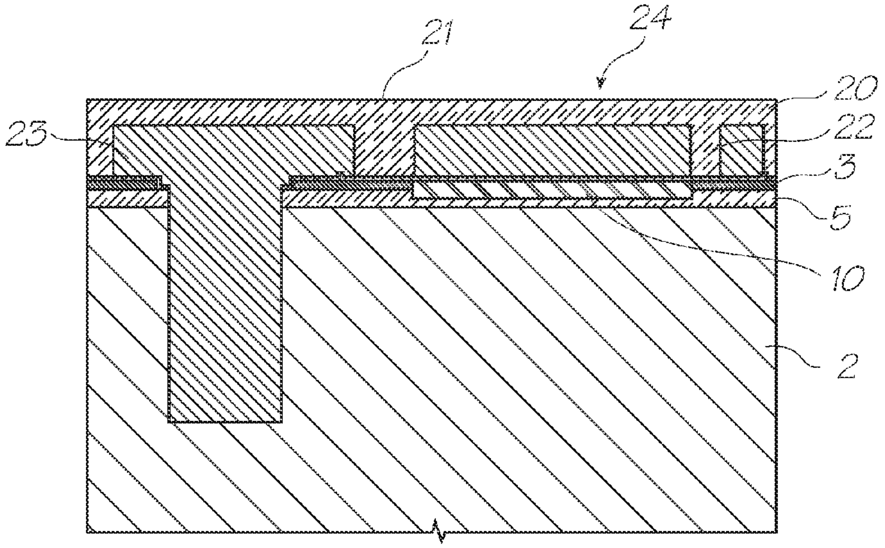
FIG. 26 shows the deposition of the side wall and risk material.
Figure 27:
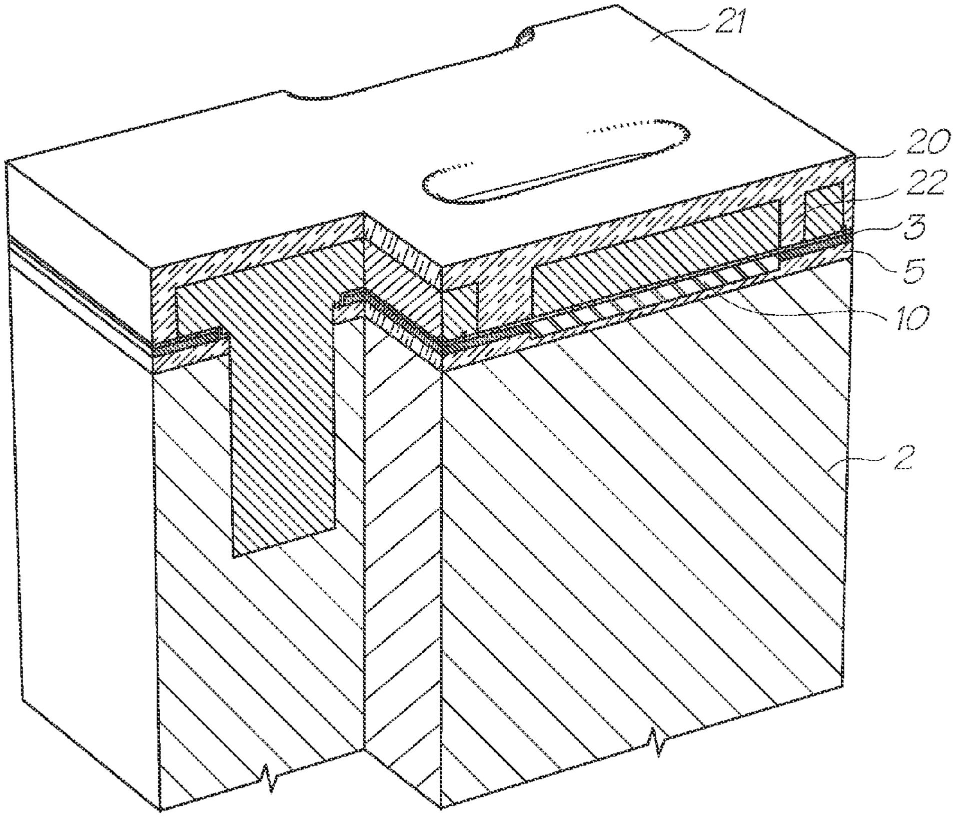
FIG. 27 is a perspective of the unit cell shown in FIG. 26.

Referring to FIGS. 26 and 27, the next stage deposits 3 microns of roof material 20 onto the SAC2 photoresist 16 by PECVD. The roof material 20 fills the openings 17, 18 and 19 in the SAC2 photoresist 16 to form nozzle chambers 24 having a roof 21 and sidewalls 22. An ink conduit 23 for supplying ink into each nozzle chamber is also formed during deposition of the roof material 20. In addition, any priming features and filter structures (not shown in FIGS. 26 and 27) are formed at the same time. The roofs 21, each corresponding to a respective nozzle chamber 24, span across adjacent nozzle chambers in a row to form a continuous nozzle plate. The roof material 20 may be comprised of any suitable material, such as silicon nitride, silicon oxide, silicon oxynitride, aluminium nitride etc.

Figure 28:
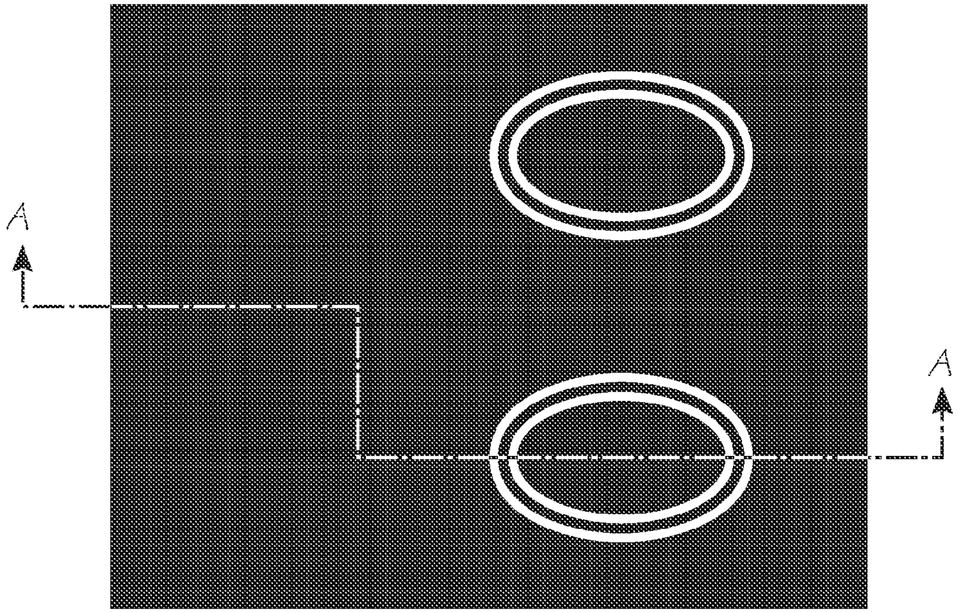
FIG. 28 is the mask associated with the nozzle rim etch shown in FIG. 29.
Figure 29:
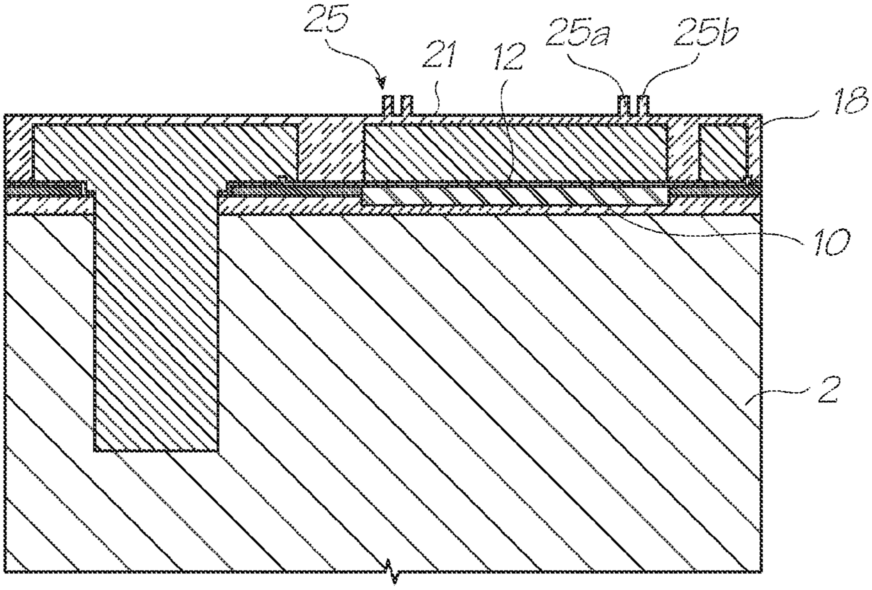
FIG. 29 shows the etch of the roof layer to form the nozzle aperture rim.
Figure 30:
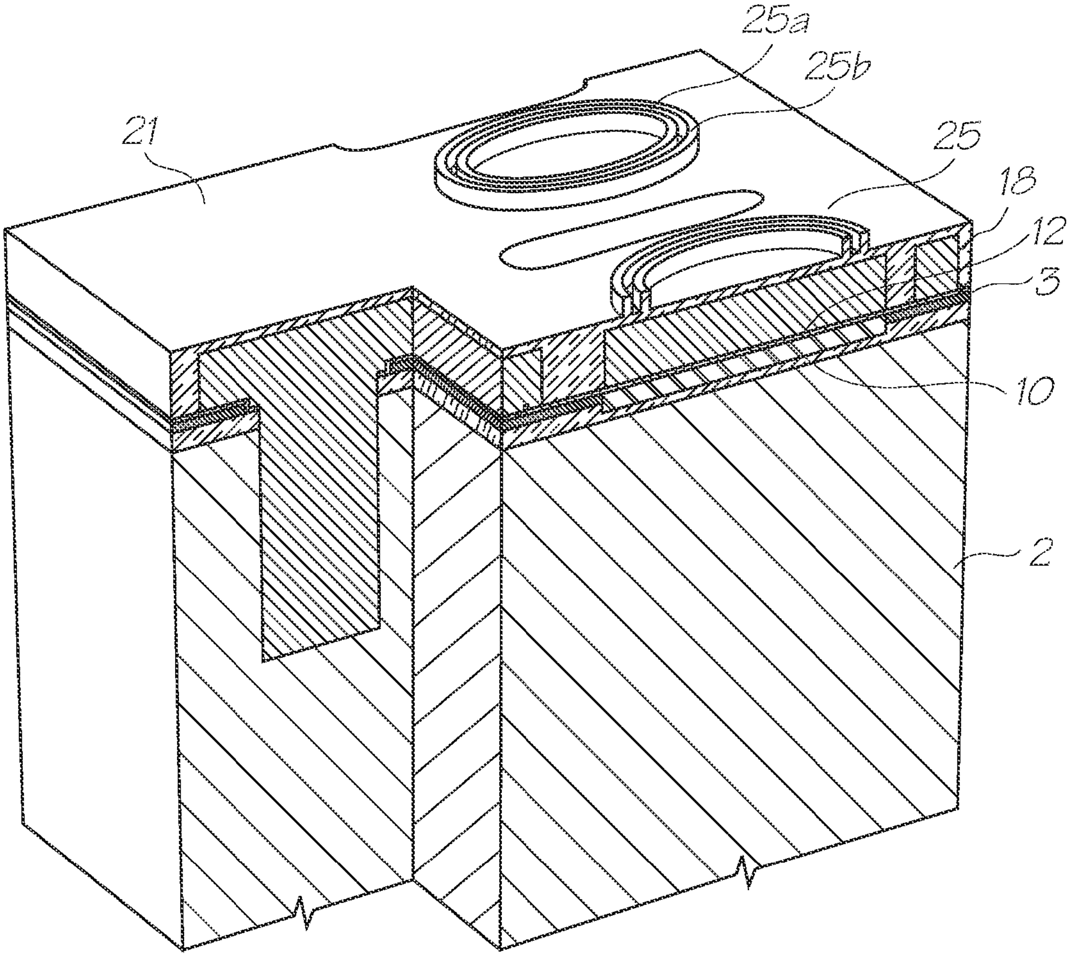
FIG. 30 is a perspective of the unit cell shown in FIG. 29.

Referring to FIGS. 28 to 30, the next stage defines an elliptical nozzle rim 25 in the roof 21 by etching away 2 microns of roof material 20. This etch is defined using a layer of photoresist (not shown) exposed by the dark tone rim mask shown in FIG. 28. The elliptical rim 25 comprises two coaxial rim lips 25*a* and 25*b*, positioned over their respective thermal actuator 12.

Figure 31:
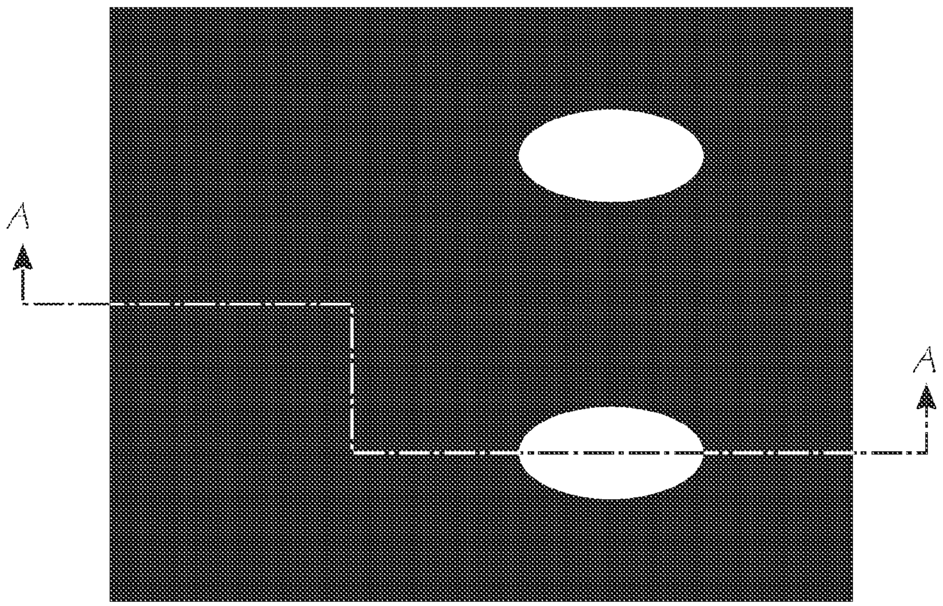
FIG. 31 is the mask associated with the nozzle aperture etch shown in FIG. 32.
Figure 32:
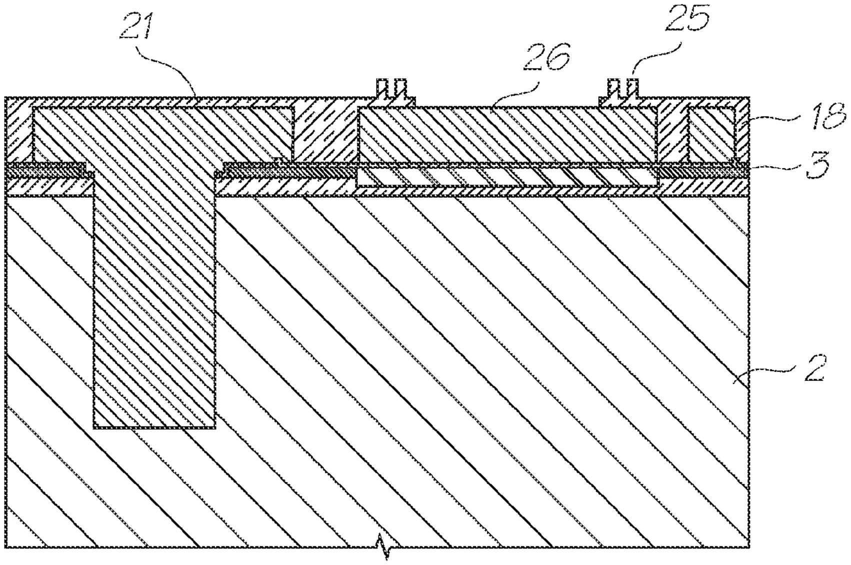
FIG. 32 shows the etch of the roof material to form the elliptical nozzle apertures.
Figure 33:
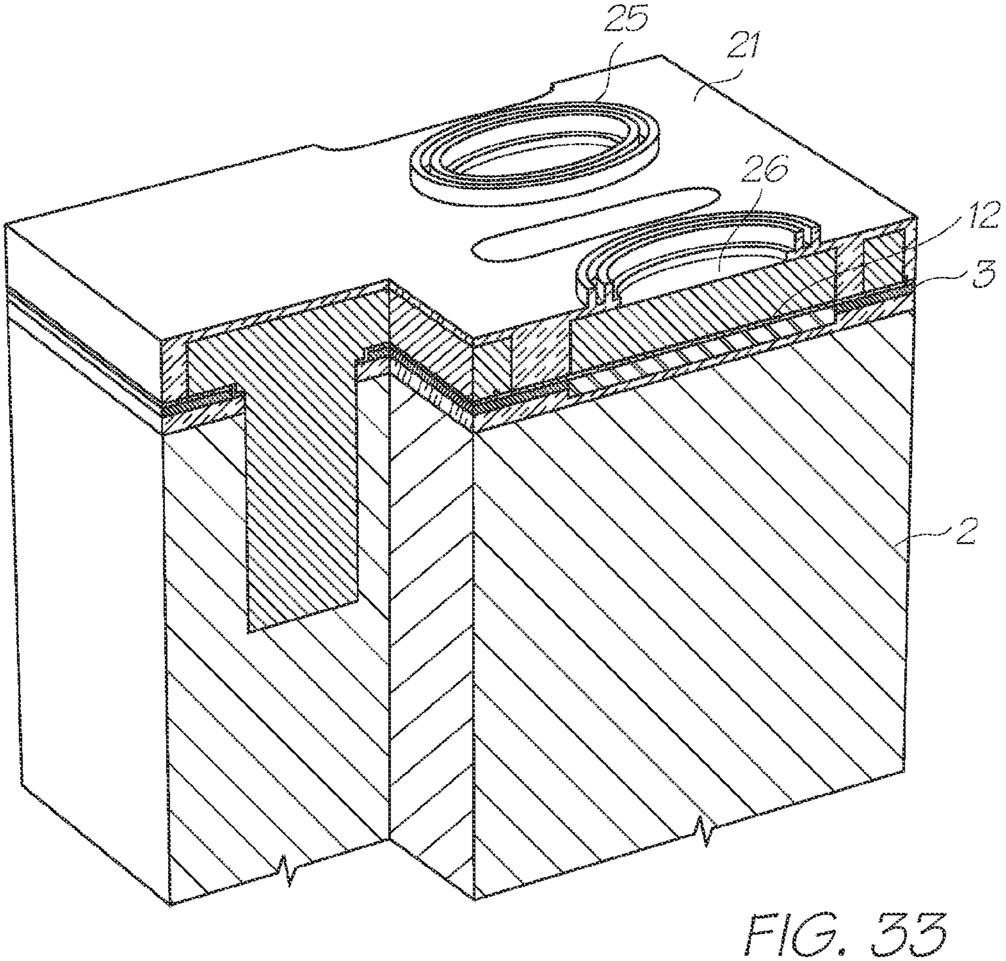
FIG. 33 is a perspective of the unit cell shown in FIG. 32.

Referring to FIGS. 31 to 33, the next stage defines an elliptical nozzle aperture 26 in the roof 21 by etching all the way through the remaining roof material 20, which is bounded by the rim 25. This etch is defined using a layer of photoresist (not shown) exposed by the dark tone roof mask shown in FIG. 31. The elliptical nozzle aperture 26 is positioned over the thermal actuator 12, as shown in FIG. 33.

Figure 34:
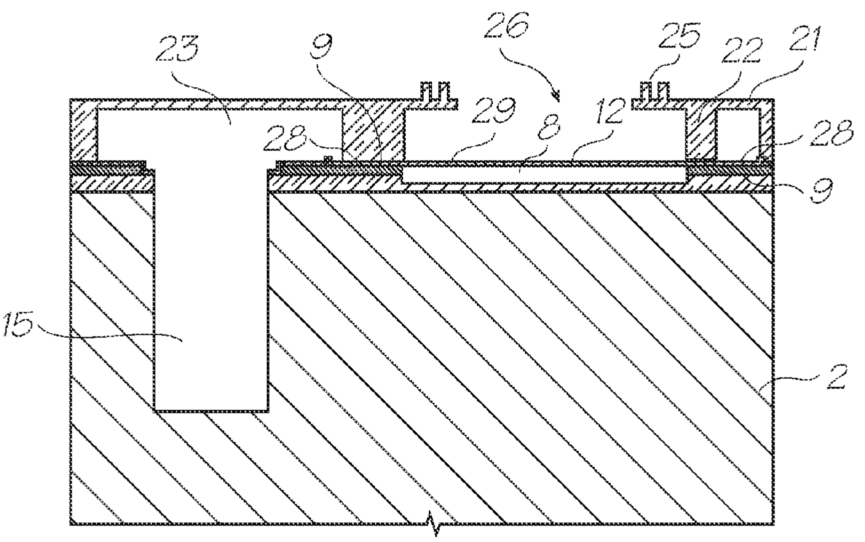
FIG. 34 shows the oxygen plasma release etch of the first and second sacrificial layers.
Figure 35:
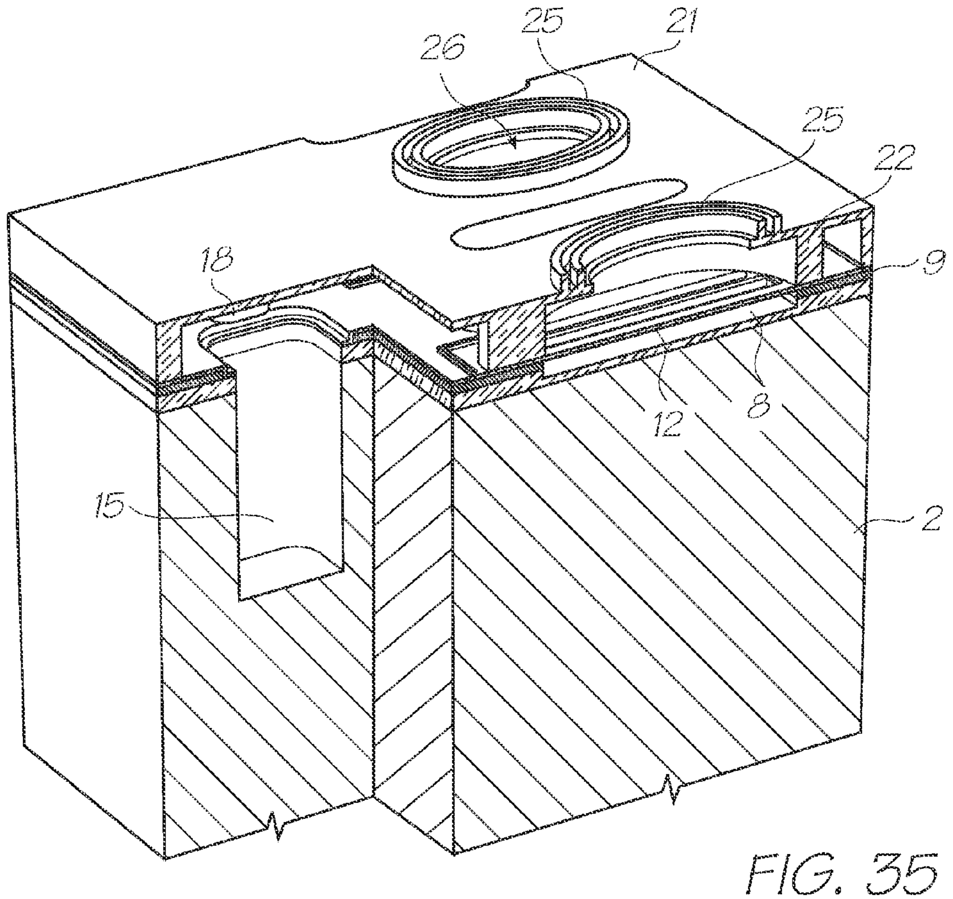
FIG. 35 is a perspective of the unit cell shown in FIG. 34.

With all the MEMS nozzle features now fully formed, the next stage removes the SAC1 and SAC2 photoresist layers 10 and 16 by $O_2$ plasma ashing (FIGS. 34 to 35). After ashing, the thermal actuator 12 is suspended in a single plane over the pit 8. The coplanar deposition of the contacts 28 and the heater element 29 provides an efficient electrical connection with the electrodes 9.

Figure 36:
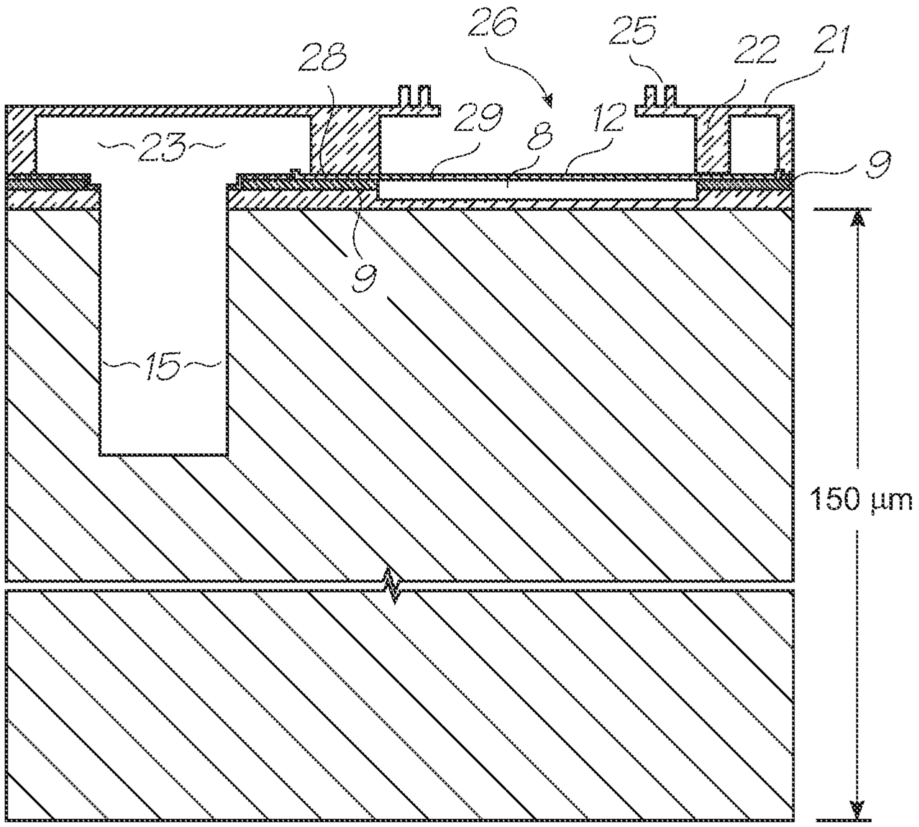
FIG. 36 shows the unit cell after the release etch, as well as the opposing side of the wafer.
Figure 37:
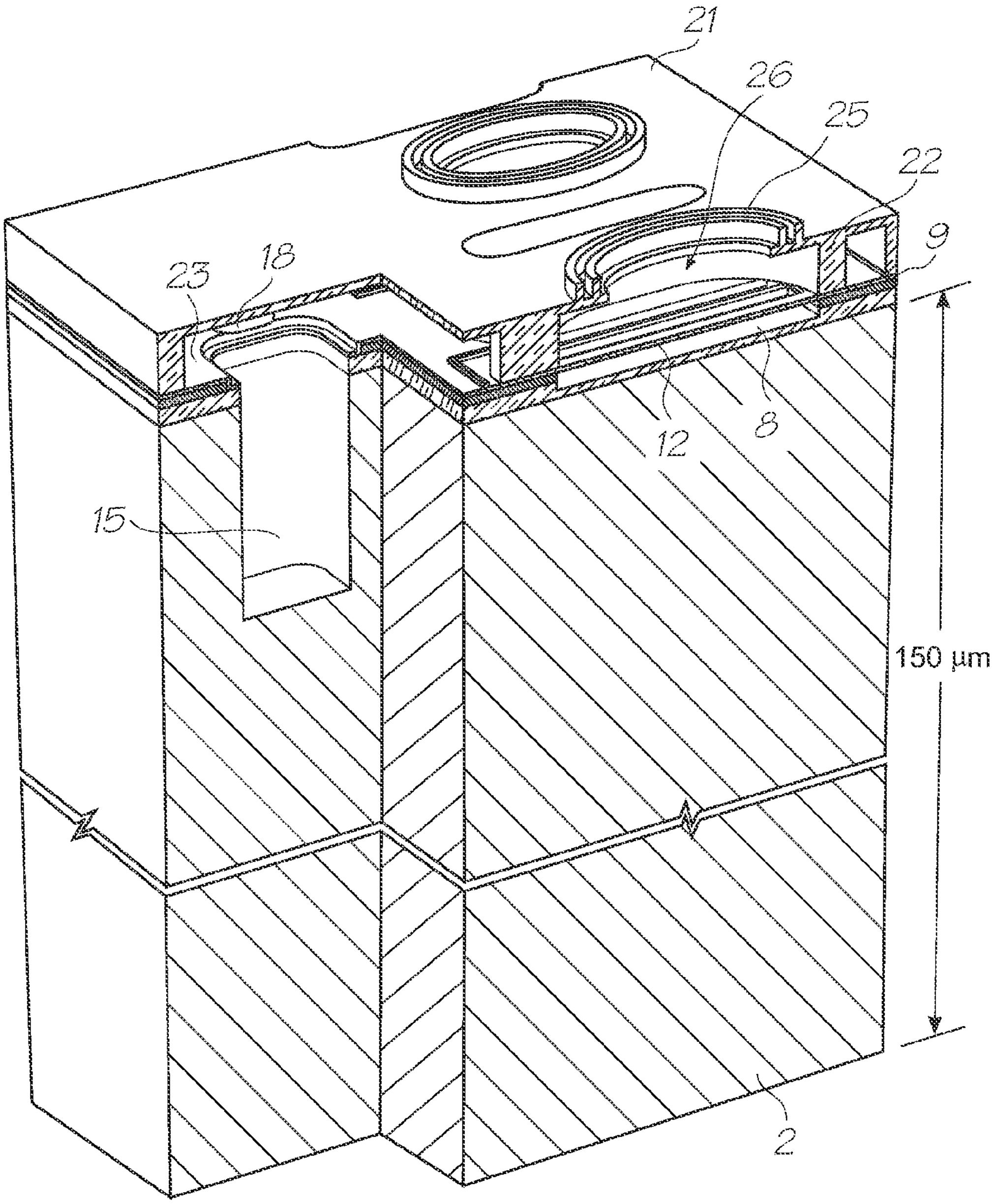
FIG. 37 is a perspective of the unit cell shown in FIG. 36.

FIGS. 36 and 37 show the entire thickness (150 microns) of the silicon wafer 2 after ashing the SAC1 and SAC2 photoresist layers 10 and 16.

Figure 38:
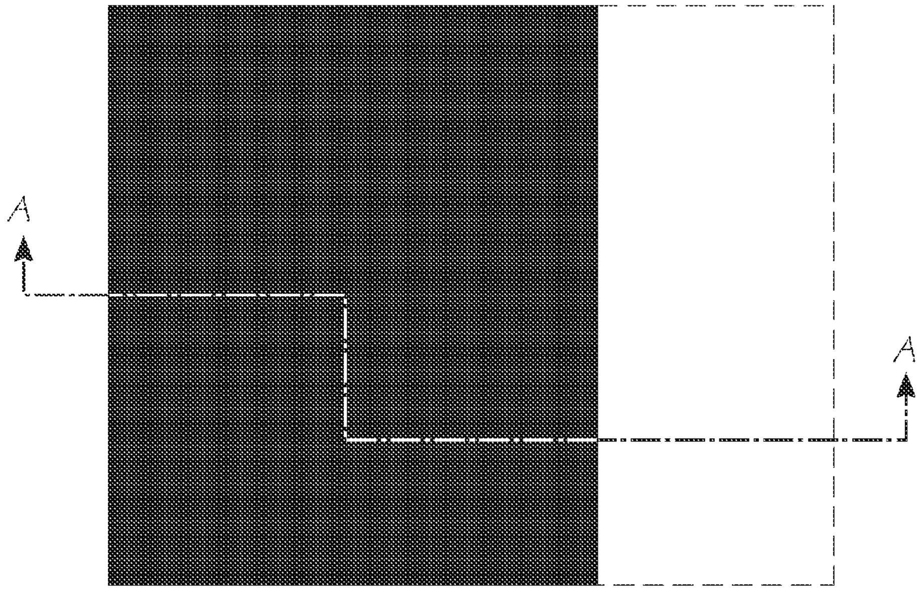
FIG. 38 is the mask associated with the reverse etch shown in FIG. 39.
Figure 39:
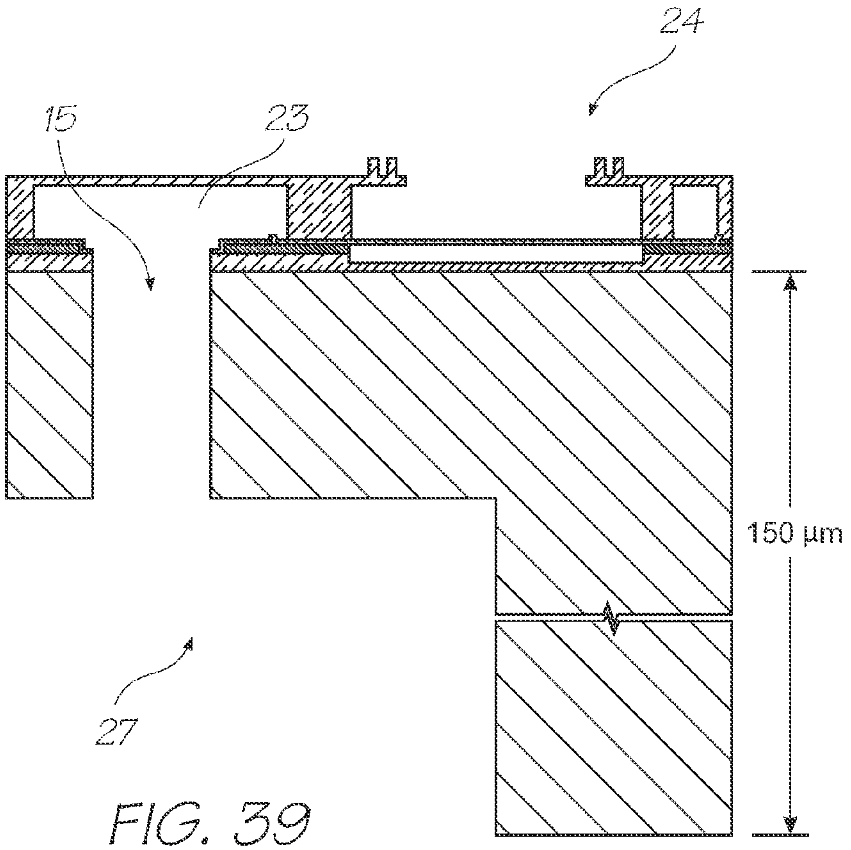
FIG. 39 shows the reverse etch of the ink supply channel into the wafer.
Figure 40:
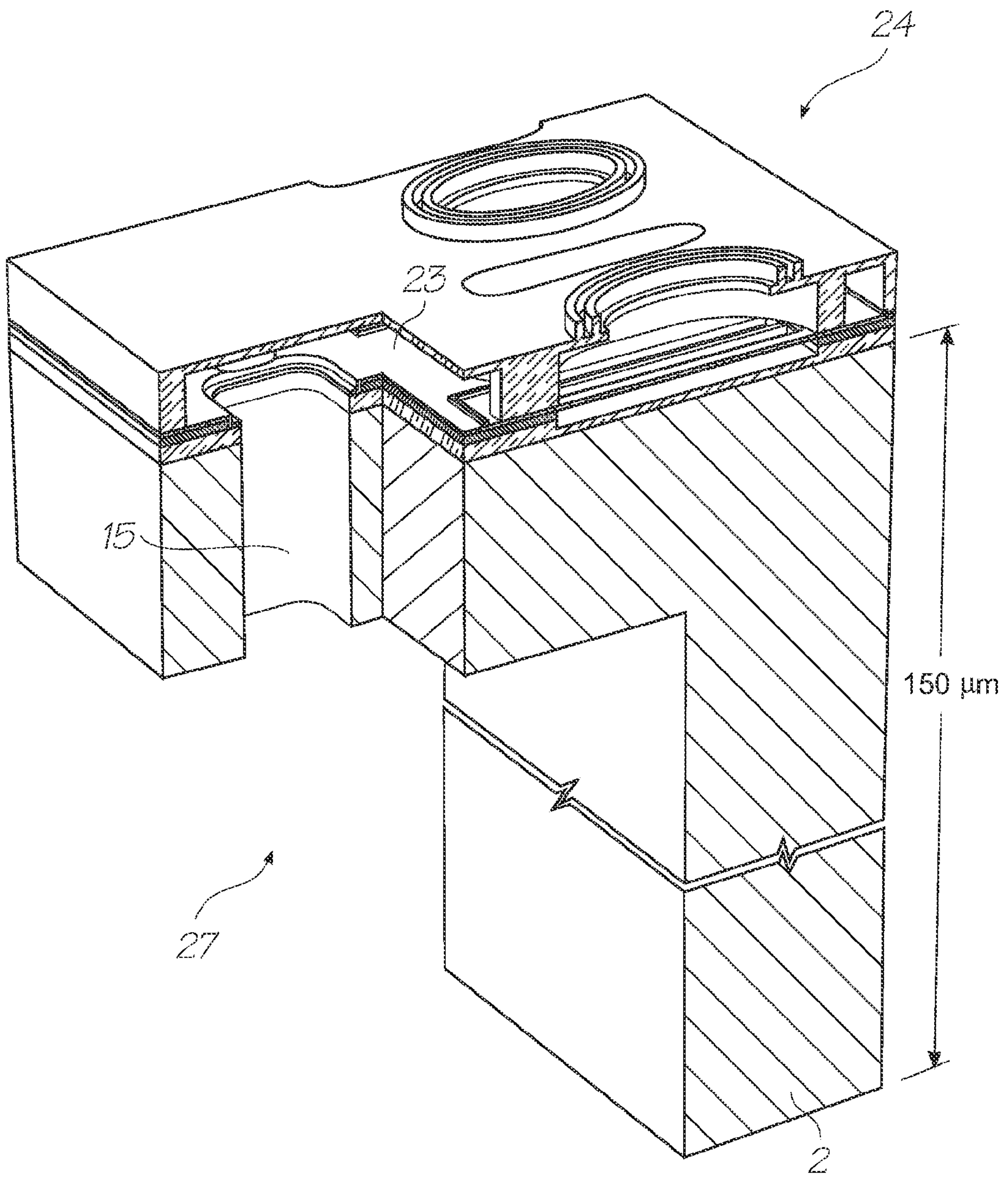
FIG. 40 is a perspective of unit cell shown in FIG. 39.

Referring to FIGS. 38 to 40, once frontside MEMS processing of the wafer is completed, ink supply channels 27 are etched from the backside of the wafer to meet with the ink inlets 15 using a standard anisotropic DRIE. This backside etch is defined using a layer of photoresist (not shown) exposed by the dark tone mask shown in FIG. 38. The ink supply channel 27 makes a fluidic connection between the backside of the wafer and the ink inlets 15.

Figure 41:
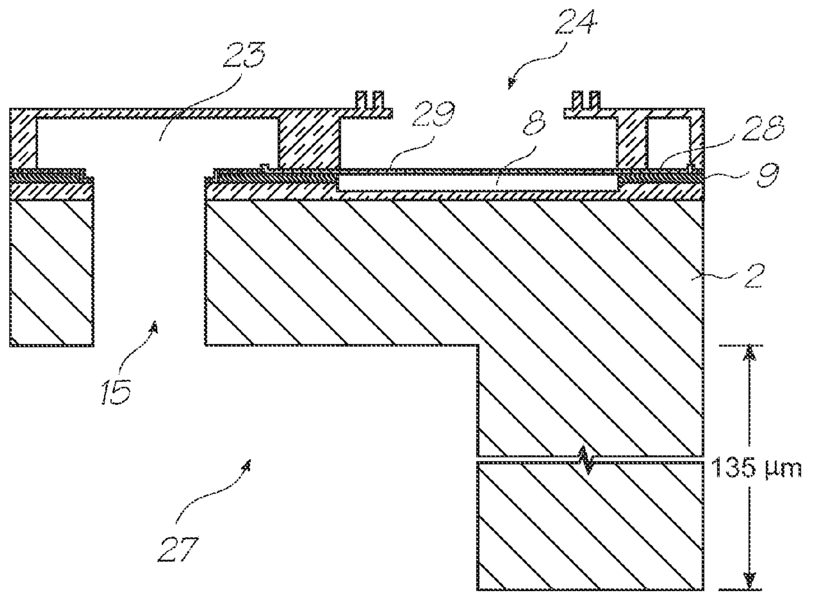
FIG. 41 shows the thinning of the wafer by backside etching.
Figure 42:
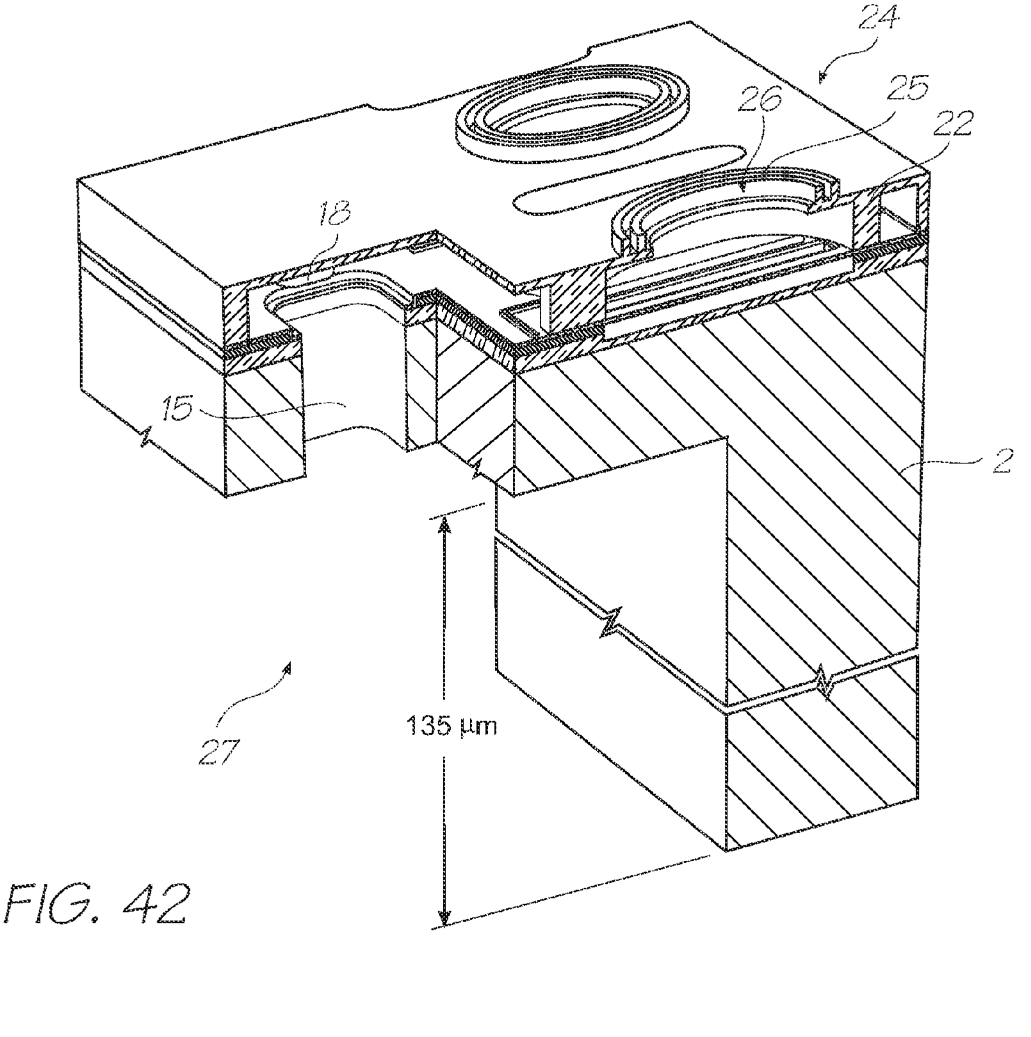
FIG. 42 is a perspective of the unit cell shown in FIG. 41.
Figure 43:
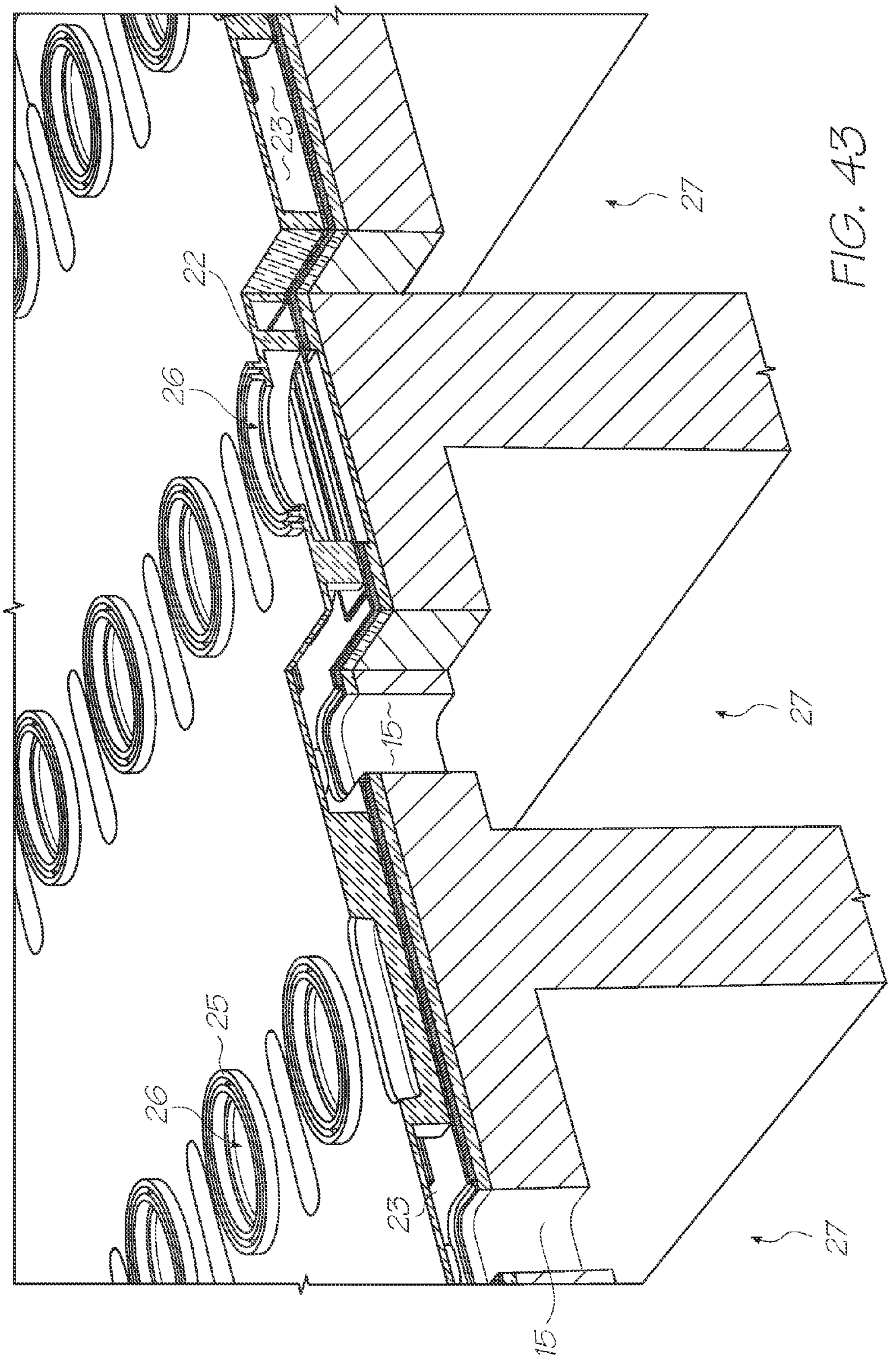
FIG. 43 is a partial perspective of the array of nozzles on the printhead according to the present invention.
Figure 45:
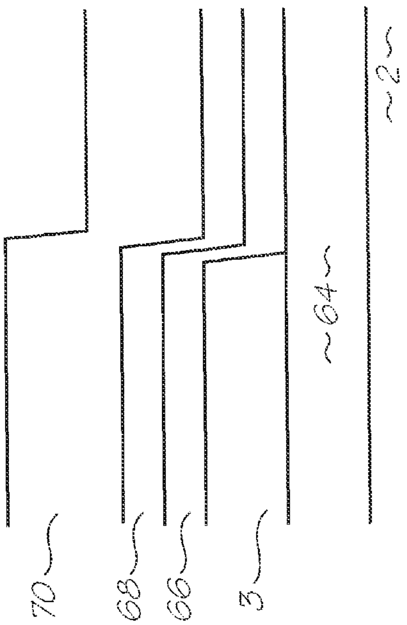
FIGS. 44 to 49 are schematic partial section views of a bonded heater embodiment of the invention; and, FIG. 50 is a schematic partial plan view of the bonded heater embodiment shown in FIGS. 44 to 49.

Finally, and referring to FIGS. 41 and 42, the wafer is thinned 135 microns by backside etching. FIG. 43 shows three adjacent rows of nozzles in a cutaway perspective view of a completed printhead integrated circuit. Each row of nozzles has a respective ink supply channel 27 extending along its length and supplying ink to a plurality of ink inlets 15 in each row. The ink inlets, in turn, supply ink to the ink conduit 23 for each row, with each nozzle chamber receiving ink from a common ink conduit for that row.

Bonded Heater Connected by Vias to Top Metal of CMOS

In the above described embodiment, electrical contact between the heater and top metal layer of the CMOS is provided by selectively etching the passivation layer and depositing the heater material directly on the exposed areas of the top metal layer. Whilst this provides reliable electrical connection it is possible to provide greater control of the characteristics of the connection by forming contact elements between the heater and the CMOS.

FIGS. 44 to 49 are sketches of the partial lithographic stack up for an alternative embodiment in which such contact elements are formed and in which the heater is not suspended within the chamber but supported along its length by an underlying insulating layer. It is understood by one of ordinary skill in the art that the alternative embodiment encompasses an embodiment in which the heater is suspended as described earlier. The deposition of the ink chamber walls and roof has been omitted in FIGS. 44 to 49 for brevity. However, one of ordinary skill in the art will readily appreciate that the fabrication of these features is the same as described above in relation to FIGS. 16 to 39.

In thermal inkjet printheads the heater is activated with electrical pulses to raise its temperature to the superheat limit of the ink (typically around 300° C. for water based ink). At this temperature a high pressure vapour bubble is formed on the surface of the resistive element of the heater. Expansion of the bubble forces ink out of the associated nozzle.

As discussed above, when the heater material is deposited on a non-planar topography, the thickness of the film varies substantially. If the film is deposited over a substantially vertical step, the film thickness on the vertical surface of the step is typically ~⅓ of the horizontal film thickness. A conductive strip of uniform width deposited over a vertical step will therefore have ~3 times the current density in the vertical section with ~9 times the volumetric heating rate (the heating rate is proportional to the square of current density). The temperature of relatively thin sections of film will far exceed 300° C. during the current pulse. This causes early failure due to, inter alia, oxidation and electro-migration.

To avoid this is, the contacts for each heater can be much wider than the resistive element. The additional width compensates for areas of reduced thickness and current density remains at safe levels.

Unfortunately, the electrical current funnels from the (laterally) wide contacts of the heater to the (laterally) much narrower resistive element that forms the vapour bubble. If the funnelling is done over a short distance, spikes in current density and hot spots can arise at or near the ends of the resistive elements, again causing early failure. Funnelling over a longer distance avoids hot spots but the parasitic resistance of the contact (i.e. non-bubble forming) portion of the heater increases, resulting in decreased efficiency.

Many of the currently available thermal inkjet printheads, use an additional low resistivity layer is deposited on top of the resistive thin film to 'short out' areas of the heater contacts deposited over non-planar topography. Volumetric heating rate is proportional to resistivity and hence the contacts sections stay relatively cool. The parasitic resistance and waste heat are low, as all but the active element of the heater is shorted by the low resistivity layer. However, the heater and the additional layer need to be coated with an insulating layer to prevent galvanic corrosion. Also, the traditional material for the additional low resistivity layer is aluminium which is prone to corrode if exposed to ink.

Coating with insulating layers increases the thermal mass that must be heated to the superheat limit to form a bubble, so this coating will increase the energy required to jet ink. As such, insulating coatings are contrary to energy efficient droplet ejection and therefore counter to self cooling operation.

Furthermore, patterning the low resistivity layer without damaging the underlying heater material film is difficult. Dry etches are preferred in most semiconductor fabrication facilities, but dry etches with suitable selectivity between the two materials, both likely to contain aluminium, are unlikely to exist. Finding a wet etch that can etch the low resistivity layer without etching the resistive thin film is likely to be easier, but would impose significant constraints on the selection of the heater film material. These selection constraints may be contrary to the goal of self cooling, which requires thin film materials with particular properties, such as very high oxidation resistance.

The technique illustrated in FIGS. 44 to 49 electrically connects the contacts 28 of the heater 12 to the underlying top metal layer 3 of the CMOS 64. This technique does not require coatings on top of the heater, does not require selective etching, has almost no parasitic resistance and no high current density areas (and hence no 'hot spots').

Figure 44:
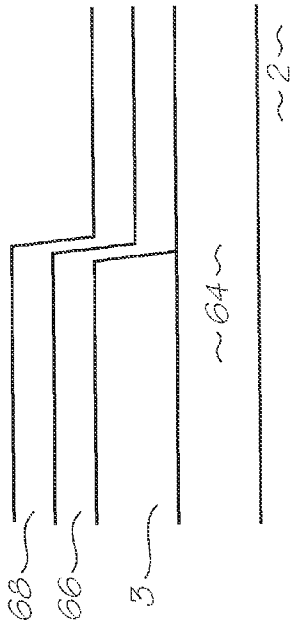

FIG. 44 shows a typical $SiO_2$ and $Si_3N_4$ (layers 66 and 68) passivation barrier that insulates the metal and the doped silicon regions of CMOS layers 64 from moisture and ionic contamination. Typically, the $SiO_2$ and $Si_3N_4$ layers are both 0.5 microns each to cover a top metal layer 3 of 0.9 microns. Previously, the insulating layer was not planarized. Any topography generated by the patterning of the topmost metal layer 3 is translated up to the top surface of the insulating layer. Heaters 12 cannot be deposited on these non-planar surfaces without suffering from the problems discussed above. Additionally, the heaters 12 cannot be put in contact with $Si_3N_4$ without compromising efficiency, as $Si_3N_4$ has a comparatively high thermal conductivity, and would draw heat away from the heater. Thus in FIG. 45, a $SiO_2$ buffer layer 70 is deposited, with thickness in excess of the top metal thickness, plus margin to account for CMP (chemical-mechanical planarization) non-uniformity—in this case the layer thickness is greater than 2.4 microns. This forms a laminate that provides an insulating layer 78.

Figure 47:
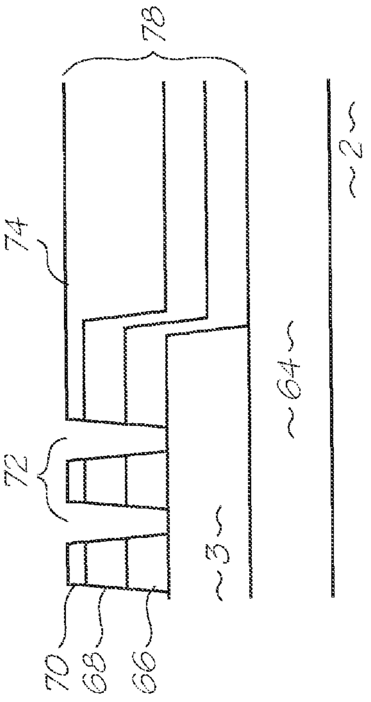
Figure 46:
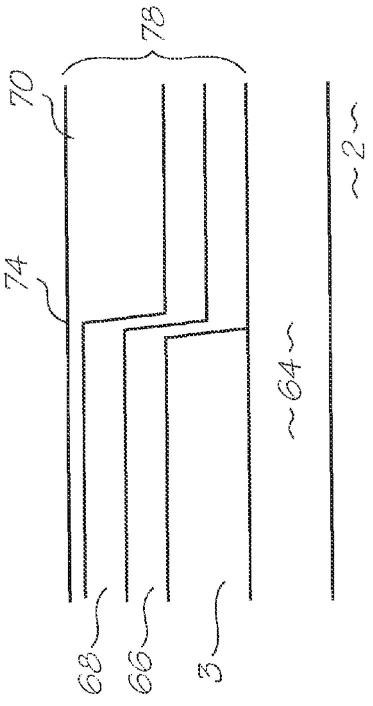

Referring to FIG. 46, CMP is used to planarize the top surface 74 of the oxide layer 70. Care is to be taken not to expose the $Si_3N_4$ 68 by keeping 0.2 microns to 0.8 microns of the oxide layer 70 covering the nitride 68 above the top metal layer 3. Elsewhere, the oxide layer 70 is 1.1 microns to 1.7 microns. The CMP also determines the ultimate length of the contact elements when they are formed. In the present embodiment, the contact elements are formed as conductive vias or plugs 76 between 1.2 microns and 1.8 microns in length. It is noted that the first oxide layer 66 or the nitride layer 68 may also be planarized by CMP, in place of the second oxide layer 70. In order to form the contact elements, contact openings in the passivation layer are formed by etching via holes 72 through the insulating laminate 78 as shown in FIG. 47 to expose the top metal 3. Then a conductive material, preferably tungsten, copper, aluminium or an alloy of these, is deposited over the laminate 78 so as to fill the via holes 72 and CMP is used to remove the deposited conductive material from the planar areas of the laminate 78 thereby forming the conductive vias 76. The deposition of the conductive material is preferably carried out using chemical vapour deposition.

Figure 49:
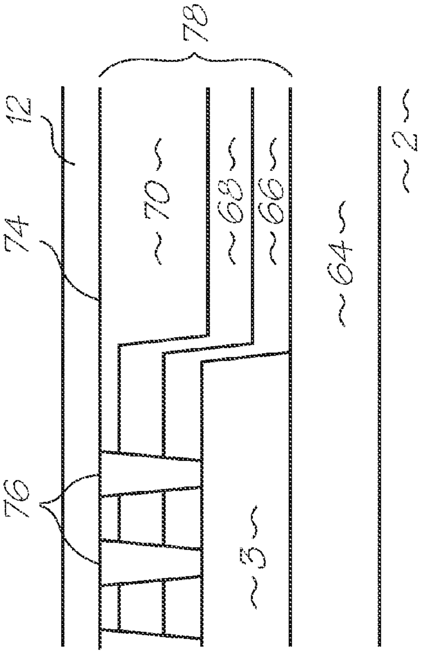
Figure 48:
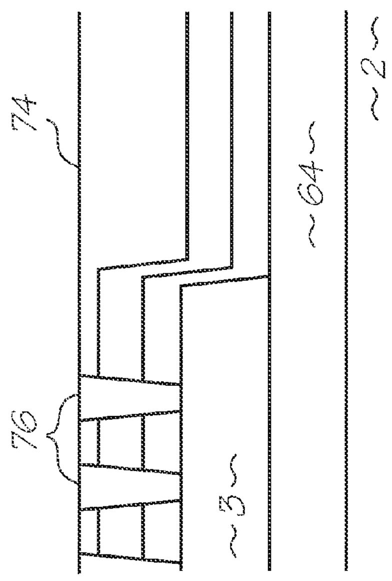

FIG. 49 shows the deposition of the heater material (TiAl, TiAlN or TiAlSiN) on top of the conductive vias 76 to provide electrical connection with the top metal 3 of the CMOS. The heater material film is then patterned to define the individual heaters 12.

The use of CMP to substantially flatten the passivation layer and the contact elements on the device scale leaves about 0.6 microns thickness variation on the wafer scale. Conventionally, about 0.5 microns of a oxide is deposited which is then capped with 0.5 microns of a nitride, such that conventional devices have about a one micron variation in topography caused by the patterning of the underlying top metal layer of the CMOS leading to the above-discussed non-planar topography which cannot be tolerated by the subsequently formed heaters.

In the illustrated embodiment, current density in the contact elements is minimized by forming the contact openings as a series of lines instead of single, large vias, as is conventional. Current crowding into each heater is also minimized by forming the contact opening lines to be shorter than the heater width, positioned symmetrically about the heater and away from the ends of the heater perpendicular to the longitudinal axis of the heater.

Figure 50:
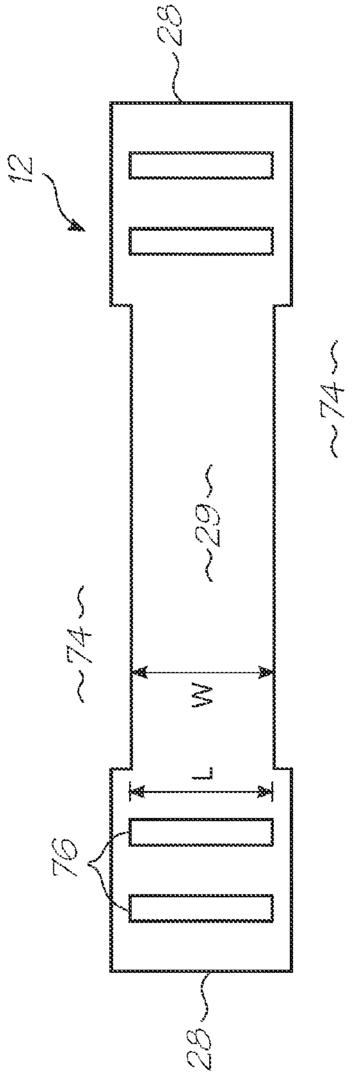

Referring to FIG. 50, each via hole 72 is about 0.5 microns shorter than the heater width and about 0.5 microns away from the ends of the respective heater, perpendicular to the longitudinal axis of that heater. The width of each via hole 72 (and therefore conductive via 76) is about 0.6 microns which provides a via aspect ratio less than three, thereby ensuring that each contact opening is filled with the conductive material. In this way, the width (L) of the conductive vias 76 is approximately the same width (W) of the resistive element 29 of the heater 12. It is also desirable to position one of the conductive vias 76 in each of the contacts 28 close to resistive element 29. These measures prevent points of excessive current density in the conductive vias 76 and the heater 12 to ensure the parasitic resistance of the electrical connection between the heater and the CMOS is very low. Similarly, the $SiO_2$ layer 70 remains thick underneath the resistive element 29 to avoid excessive heat loss into the silicon nitride 68.

Forming each contact element as a series of conductive via lines can lead to the conductive via closest to the heater carrying most of the current and heat. Thus, providing the multiple conductive vias may extend the life of the contact element if the closest conductive via fails due to the extra current and heat load. Referring to FIG. 50, two conductive vias 76 on each end of the heater 12 formed as two parallel lines spaced about 0.6 microns from one another is illustrated. However, each contact element can be formed as a single conductive via or more than two conductive vias.

Although the invention is described above with reference to specific embodiments, it will be understood by those skilled in the art that the invention may be embodied in many other forms.

The invention claimed is:

1. A method of fabricating an inkjet printhead comprising the steps of:

providing a supporting substrate;

depositing and patterning a conductive layer on one side of the supporting substrate;

depositing an insulating layer on the conductive layer;

etching holes through the insulating layer to the conductive layer;

depositing metal in the holes to form metallic vias;

planarizing an outer surface of the insulating layer and one end of each of the metallic vias respectfully; and, depositing and patterning a layer of heater material on the outer surface to form a heater with a resistive element extending between a pair of contacts; wherein, the metallic vias electrically connect the contacts to the conductive layer.

2. A method according to claim 1 wherein the step of planarizing the outer surface is a chemical, mechanical planarization process.

3. A method according to claim 1 wherein the resistive element is an elongate strip extending between the contacts and the at least one metallic via in each of the contacts has a width substantially equal to the width of the strip.

4. A method according to claim 1 wherein the insulating layer is a laminate of three separately deposited layers.

5. A method according to claim 1 wherein the conductive layer is a top-most metal layer in a stack of CMOS layers on the supporting substrate.

* * * * *